United States Patent [19]

Zheng et al.

[11] Patent Number: 6,094,509
[45] Date of Patent: Jul. 25, 2000

[54] METHOD AND APPARATUS FOR DECODING TWO-DIMENSIONAL SYMBOLS IN THE SPATIAL DOMAIN

[75] Inventors: Joe Zheng, Brookfield; Ming Lei, Danbury, both of Conn.

[73] Assignee: United Parcel Service of America, Inc., Atlanta, Ga.

[21] Appl. No.: 08/909,574

[22] Filed: Aug. 12, 1997

Related U.S. Application Data

[63] Continuation of application No. 08/304,667, Sep. 9, 1994, abandoned, which is a continuation-in-part of application No. 08/254,976, Jun. 7, 1994, Pat. No. 5,515,447.

[51] Int. Cl.[7] .................................. G06K 9/68; G06K 7/10
[52] U.S. Cl. .......................... 382/218; 235/464; 379/910; 382/183; 382/278
[58] Field of Search ...................................... 382/100, 101, 382/139, 140, 183, 209, 217, 218, 216, 313, 203, 278, 287; 235/462, 464, 494–495; 379/910

[56] References Cited

U.S. PATENT DOCUMENTS

| | | | |
|---|---|---|---|
| 3,632,995 | 1/1972 | Wilson | 235/61.12 |
| 3,715,724 | 2/1973 | Demonte et al. | 382/227 |
| 3,801,775 | 4/1974 | Acker | 235/61.11 |
| 3,885,229 | 5/1975 | Negita et al. | 382/317 |
| 4,286,146 | 8/1981 | Uno et al. | 235/456 |
| 4,516,017 | 5/1985 | Hara et al. | 235/462.28 |
| 4,695,991 | 9/1987 | Hudson | 369/44.34 |
| 4,696,049 | 9/1987 | Musso | 382/282 |
| 4,718,103 | 1/1988 | Shojima et al. | 382/189 |
| 4,736,441 | 4/1988 | Hirose et al. | 382/101 |
| 4,745,269 | 5/1988 | Van Gils | 235/487 |
| 4,776,464 | 10/1988 | Miller et al. | 209/3.3 |
| 4,874,936 | 10/1989 | Chandler et al. | 235/494 |
| 4,896,029 | 1/1990 | Chandler | 235/494 |
| 4,924,078 | 5/1990 | Sant'Anselmo et al. | 235/494 |
| 4,939,354 | 7/1990 | Priddy et al. | 235/456 |
| 4,947,383 | 8/1990 | Hudson | 369/44.11 |
| 4,955,062 | 9/1990 | Terui | 382/144 |
| 5,053,609 | 10/1991 | Priddy et al. | 235/436 |
| 5,059,774 | 10/1991 | Kubo et al. | 235/494 |

(List continued on next page.)

FOREIGN PATENT DOCUMENTS

| | | |
|---|---|---|
| 0 573 129 A2 | of 1989 | European Pat. Off. . |
| 0 449 634 A2 | of 1991 | European Pat. Off. . |
| 0 484 132 A3 | of 1991 | European Pat. Off. . |
| 0 484 935 A2 | of 1991 | European Pat. Off. . |
| 1-137385 | 5/1989 | Japan . |
| 4-268989 | 9/1992 | Japan . |
| 2 218 240 | of 1989 | United Kingdom . |
| PCT/US86/00537 | 10/1986 | WIPO . |
| PCT/US95/08432 | 1/1995 | WIPO . |

*Primary Examiner*—Jon Chang
*Assistant Examiner*—Jayanti K. Patel
*Attorney, Agent, or Firm*—Jones & Askew LLP

[57] ABSTRACT

A method and system for decoding a two-dimensional optical symbol in the spatial domain. The system determines the orientation of an imaged symbol in the spatial domain by using a template to derive a correlation coefficient between radially adjacent signals at a given angle of the template and comparing the correlation coefficients as the template is rotated with respect to the image. The angle of the highest correlation coefficient corresponds to the orientation of a set of symbol axes which include contiguous elements whose centers are collinear. The system then locates each individual information-encoded element of the symbol by using segments of the symbol defined by the axes, first adjusting for each segment the axis position and element size for subsequent determination of the location of all elements for decoding. The system is disclosed as applied to a symbol constructed as a matrix of hexagonal information-encoding elements arranged in a square, with, at its center, an acquisition target consisting of six concentric rings of alternating light and dark reflectivity.

25 Claims, 12 Drawing Sheets

U.S. PATENT DOCUMENTS

| | | | |
|---|---|---|---|
| 5,068,909 | 11/1991 | Rutherford et al. | 382/302 |
| 5,103,489 | 4/1992 | Miette | 382/173 |
| 5,124,536 | 6/1992 | Priddy et al. | 235/432 |
| 5,126,542 | 6/1992 | Priddy et al. | 235/432 |
| 5,153,418 | 10/1992 | Batterman et al. | 235/494 |
| 5,153,928 | 10/1992 | Iizuka | 382/321 |
| 5,155,343 | 10/1992 | Chandler et al. | 235/462.09 |
| 5,189,292 | 2/1993 | Batterman et al. | 235/494 |
| 5,229,591 | 7/1993 | Heiman et al. | 235/462.25 |
| 5,241,166 | 8/1993 | Chandler | 235/494 |
| 5,276,315 | 1/1994 | Surka | 235/462.1 |
| 5,291,564 | 3/1994 | Shah et al. | 382/291 |
| 5,327,171 | 7/1994 | Smith | 348/223 |
| 5,329,105 | 7/1994 | Klancnik et al. | 235/462.16 |
| 5,495,537 | 2/1996 | Bedrosian et al. | 382/209 |

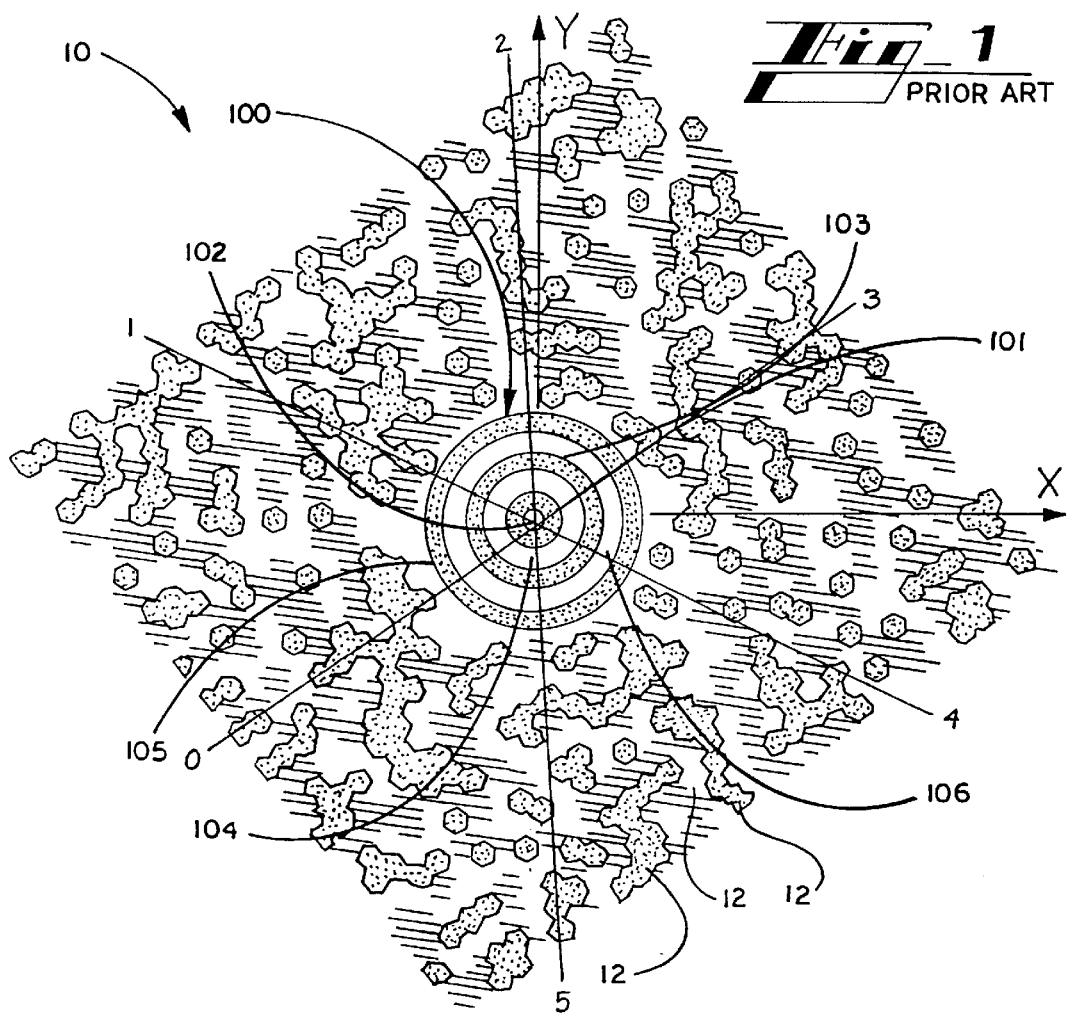
Fig_1 PRIOR ART
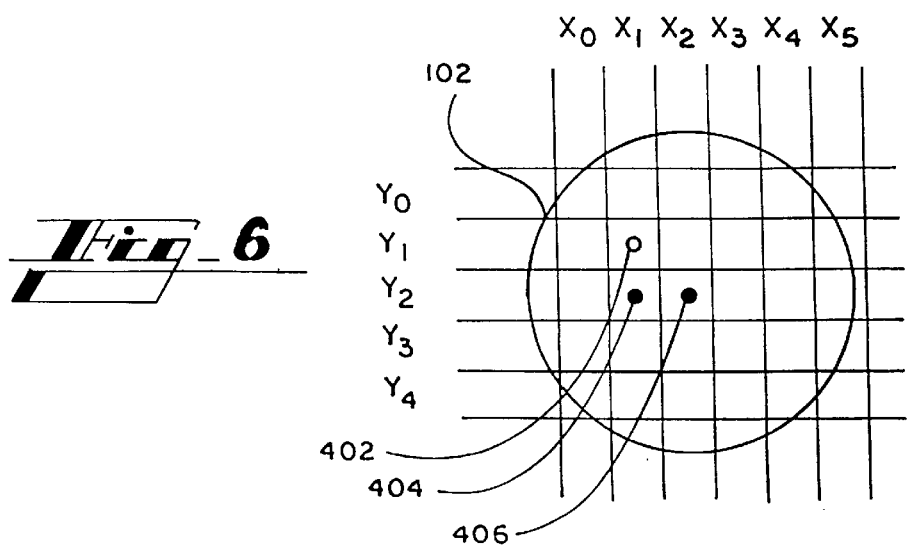
Fig_6

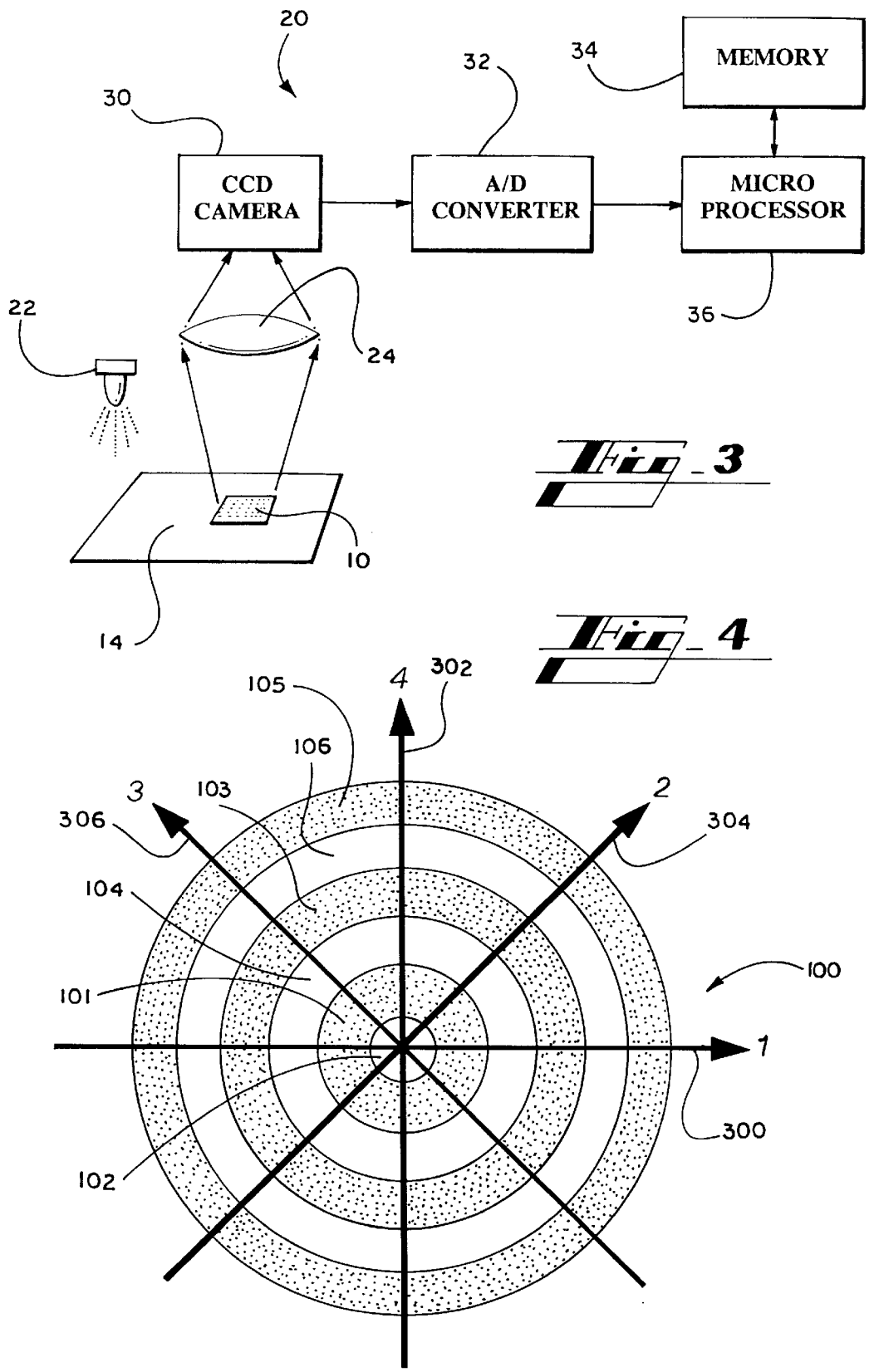

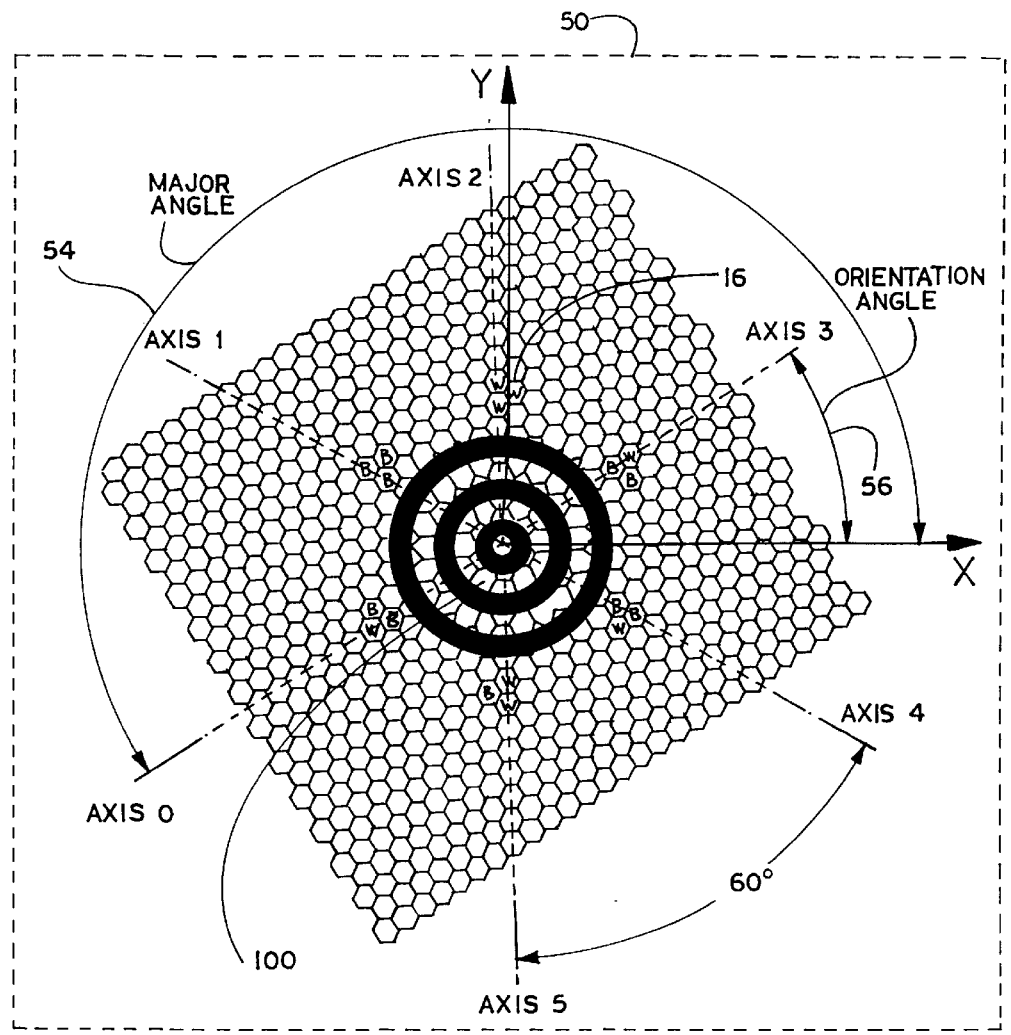
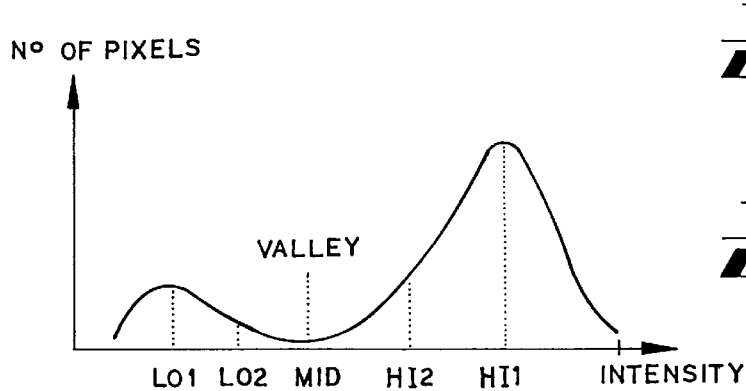
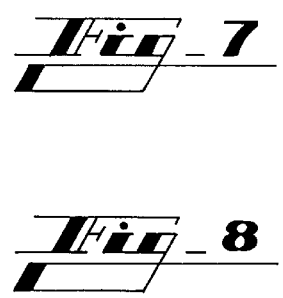

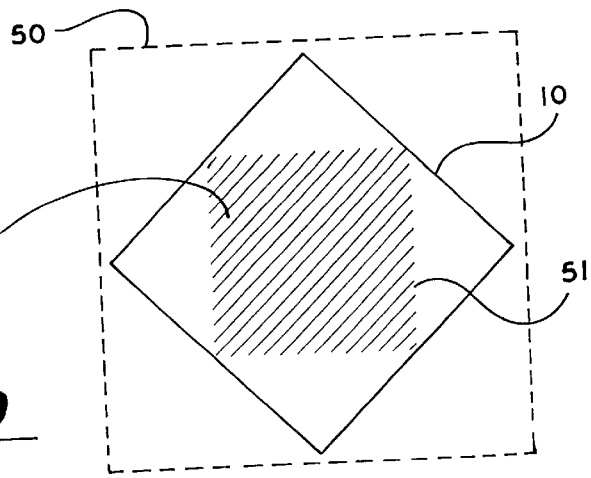
Fig_9
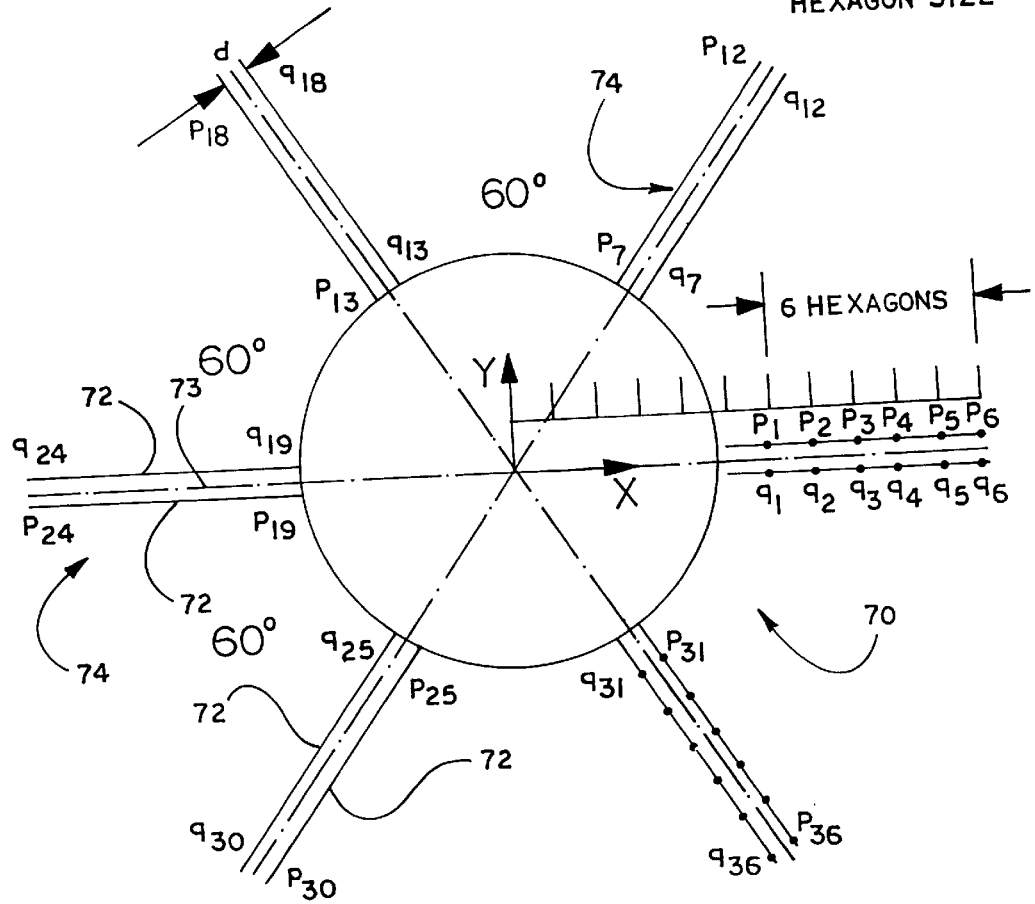
Fig_10

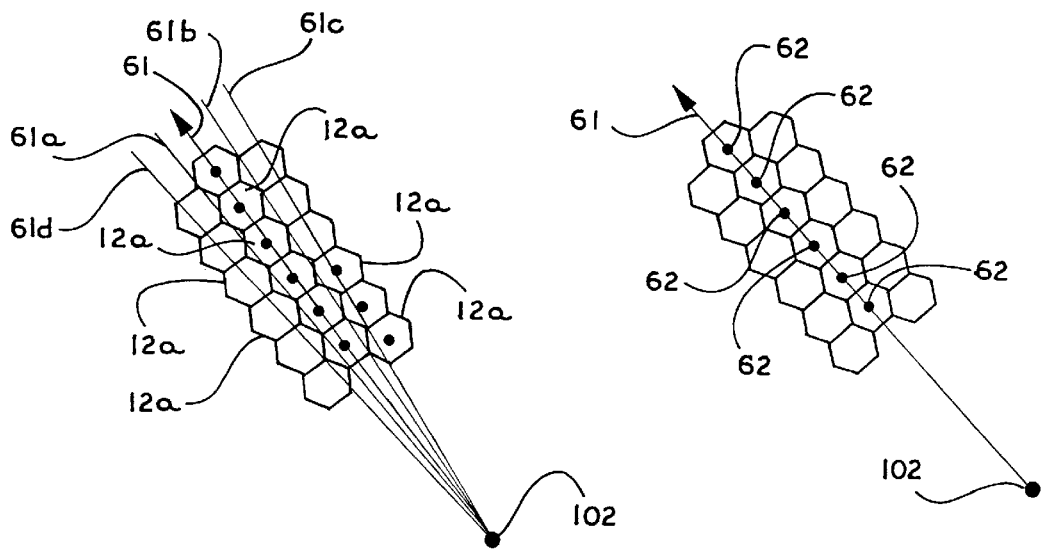
Fig_13A
Fig_13B
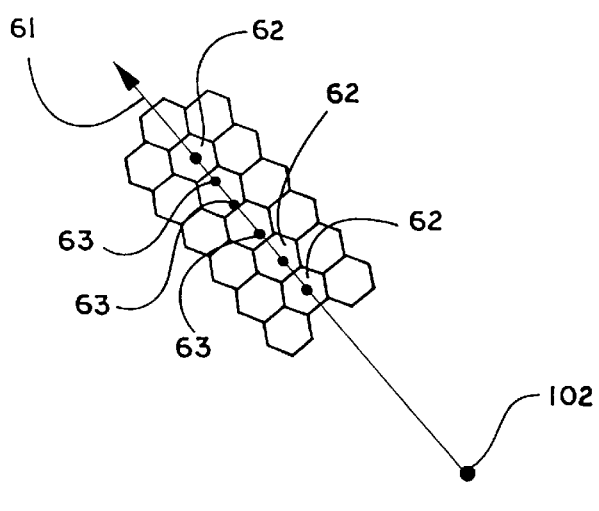
Fig_13C
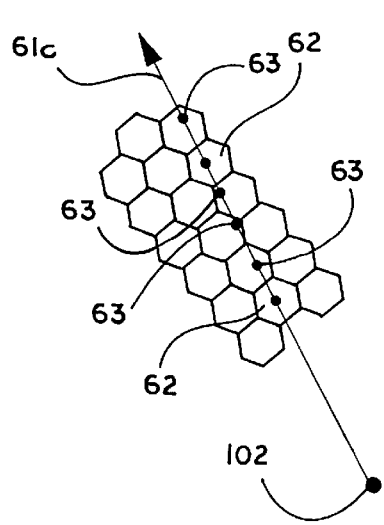
Fig_13D

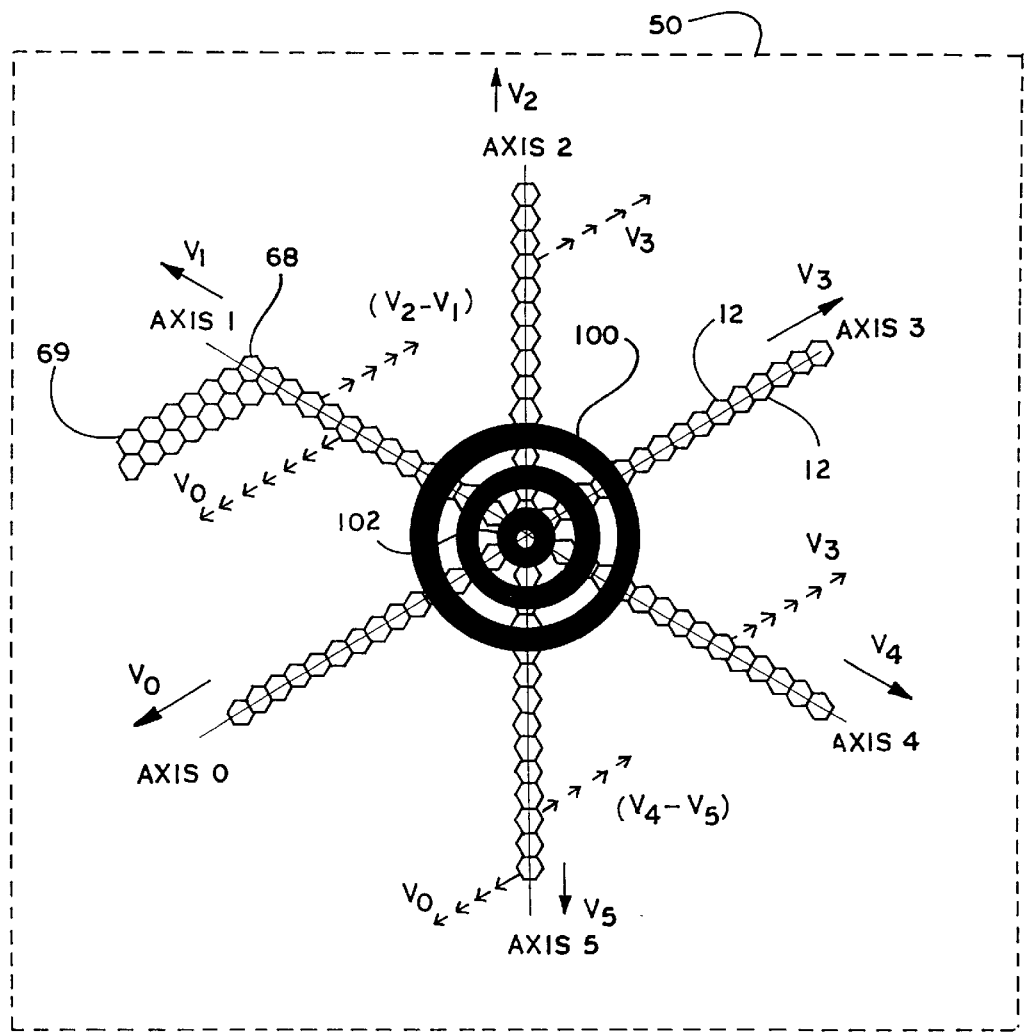
Fig_16
Fig_15A
Fig_15B

METHOD AND APPARATUS FOR DECODING TWO-DIMENSIONAL SYMBOLS IN THE SPATIAL DOMAIN

CROSS REFERENCE TO RELATED APPLICATION

This is a continuation of application Ser. No. 08/304,667 filed Sep. 9, 1994, now abandoned.

This invention is a continuation-in-part of application, Ser. No. 08/254,976, filed Jun. 7, 1994.

1. Technical Field

The present invention relates to optically encoded symbologies, and more particularly relates to decoding a two-dimensional optical symbol in spatial domain.

2. Background of Related Art

Optical symbology refers to an information encoded symbol that is only readable by an optical sensing mechanism through a decoding process. For years, the bar code has been promoted as a machine-readable symbology. A bar code is a one-dimensional symbol that contains a unique serial number encoded in black and white bars. Bar codes are widely used as indices to associate physical objects with larger databases containing more detailed information.

As the demand for information-based technologies grows, there is considerable interest in eliminating the associated database and storing more data information in the bar code itself. With current technology, encoding additional information makes a one-dimensional bar code unrealistically long. A number of two-dimensional symbologies, either in the form of a stacked bar code or a matrix type, have been introduced to accommodate this need.

A two-dimensional symbol is composed of a two-dimensional array of elements which comprise information cells. The size of the array, or the size of a symbol is then determined by the encoding procedures and the information to be encoded. The cells in the symbol are generally polygonal in shape and appear to be as either white or black. Thus, a symbol is comprised based on the geometric shape of the cells and the structures. All elements, either white or black, in a symbol are equal-sized and equal-shaped.

The primary objective of using a two-dimensional symbology is to eliminate the associated database as used in bar code applications. Thus, the symbol becomes a portable information carrier that is database independent. The feature of being an information carrier is particularly important in transportation and distribution industries in which letters, packages, containers, and other related items that are shipped or transported are generally identified by the origin, flight number, destination, name, price, part number, and other information. The information is encoded into a label which is read along the distribution route. Other applications for these labels include automatic routing and sorting of mail, parcels, and baggage.

One of the two-dimensional symbologies, publicly known as MaxiCode symbology, is disclosed in U.S. Pat. Nos. 4,874,936 and 4,896,029 to Chandler and et al. The disclosed symbol is an example in which the cells are hexagonal in shape and approximately 30 mils in diameter. To decode such a symbol, one has to determine the reflectance intensity on each element. To correctly determine the gray scale intensity of each hexagonal element, first the position and orientation of the symbol must be found, and the location of the center of each element identified.

In both '936 and '029, a general methodology using Fourier Transform in the decoding process is described. The principle is to transform a spatial-domain represented image containing the symbol into a spectrum domain where the structure information of the symbol is extracted for subsequent determination of the cell intensity. The hexagon-based symbol described in '936 and '029 in which the unique structure and representation of the encoding elements in the spatial domain forms an array of six highly concentrated energy points, known as the bright points, in the spectral domain. They are equally positioned 60 degrees apart if the original label has no distortion. A search is followed to locate the position of the primary set to infer the orientation of the label in the spatial-domain. The method disclosed is called the spectral-domain method in the field. Yet, the method is also well known to be one of the most computationally expensive methods because of the involvement of the Fourier Transform computations. For real time applications, expensive hardware must be used to reach the required processing speed. This method has been used in automatic sorting applications in which over-head readers are employed. The cost of the computer hardware in such applications is acceptable compared to the cost of the whole sorting systems.

Besides requiring expensive hardware implementation, the spectral method empirically demonstrated other problems. For example, the noisy information such as the gray scale variations outside the symbol within the image may adversely contribute to the spectrum and make it possible to fail the decoding process. These gray scale variation may be caused by printed characters, signs, dirt or material uneven reflectivity around the symbol.

In many other applications such as handheld readers, there is a great need for cost-effective reading systems, a goal which requires fast decoding but much less hardware. There has further been a need in the art for a system of reduced computational complexity for decoding symbols which at the same time is more efficient and more reliable. There also has been a need for a system that can efficiently decode the symbol at varying distance.

SUMMARY OF THE INVENTION

The present invention has been made in consideration of the above described problems. The present invention provides an improved system for determining the orientation of an imaged symbol in spatial domain by calculating the correlation coefficient between radially adjacent signals and locating each individual information-encoded element by using multiple segments, and adjusting for each segment its position and element size for subsequent determination of the location of all elements for decoding.

Generally described, the present invention provides a system and method of processing an image containing one or more sets of contiguous elements whose centers are collinear, using the technique of developing a sampling template having a series of pairs of points spaced along a line, a first point of each pair being spaced a short distance from a second point of the pair in a direction perpendicular to said line; positioning the template on the image data; comparing gray scale intensities of the first points of the pairs to gray scale intensities of respective second points of the pairs to determine a correlation factor between the first points and the second points; moving the sampling template into varying orientations within the image and determining the correlation factor for each position of the template; and locating the one or more sets of collinear elements by finding one or more template positions associated with the highest correlation factors.

According to one aspect of the invention, the spatial-domain method relies solely on signal processing in the spatial domain. In determining the orientation of an imaged MaxiCode symbol, for example, a template comprising six spindles spaced 60 degrees apart rotates within a 60 degree range about the center of the symbol. Two parallel signals along each spindle are extracted at an incremental angle and their correlation coefficient is computed. A certain number of the correlation coefficients with the highest values are prioritized to estimate the potential orientation of the symbol. Based on the estimated orientation angle, six axes forming six segments are defined in the symbol. Each axis as well as the hexagon size along its axis position can be finely adjusted to obtain the accurate orientation and hexagon size for each segment using the gray scale values of neighboring hexagons along the axis. Within each segment, using the adjusted parameters, the center of each hexagon is then located from the known geometry of the symbol. A table representing the symbol is obtained by identifying the gray scale value of the pixel representing the center of each hexagon.

As will become clear in the following description, all the signal processing procedures start from the center of the symbol. From this comes the resistance of the present invention to interference from undesirable signals such as printed characters, graphics or dirt around the symbol. The efficiency of the processing procedures in the present invention can be appreciated since only one portion of signal containing the symbol is processed.

Therefore an important object of the present invention is to provide a generic solution to decoding imaged two-dimensional symbols in spatial domain.

It is a further object of the present invention to provide an improved system for decoding such symbols which is cost-effective in hardware implementation.

It is still another object of the present invention to provide an improved system for decoding such symbols which has fast computational capabilities.

It is still another object of the present invention to provide an improved system for decoding such symbols which is portable and useful for handheld applications.

It is still another object of the present invention to provide an improved system for decoding such symbols which provides an instant decoding response.

It is still another object of the present invention to provide an improved system for decoding such symbols which requires no additional memory for storing transitional image data.

It is still another object of the present invention to provide an improved system and method for decoding such symbols which is efficient in computation.

It is still another object of the present invention to provide an improved system and method for decoding such symbols which is insensitive to variations in image resolution.

It is still another object of the present invention to provide an improved method for decoding such symbols which processes the imaged symbol portion of an entire image.

It is still another object of the present invention to provide an improved method for decoding such symbols which is resistant to the surrounding image information around the symbol.

Other objects, features and advantages of the present invention will become apparent upon examining the following description of the preferred embodiment of the invention, when taken in conjunction with the accompanying drawings and the appended claims.

BRIEF DESCRIPTION OF THE DRAWINGS

FIG. 1 is a plan view of a two-dimensional symbol with indicated six axes.

FIG. 3 is a system block diagram for imaging a two-dimensional acquisition target or symbol in which the processor is configured according to the present invention.

FIG. 4 shows the axes used to test the symmetric features of the acquisition target in the preferred embodiment of the invention.

FIG. 6 shows diagrammatically a fine-tuning procedure for determining the center of a key element.

FIG. 7 is a plan view of the symbol with an arbitrary orientation inside an image frame.

FIG. 8 shows a method of selecting the four thresholding levels from a histogram.

FIG. 9 is a plan view of the area inside the symbol used in generating the histogram.

FIG. 10 is a plan view of the template designed for generating the one-dimensional orientation signal in the preferred embodiment of the invention.

FIG. 13A shows a selection of trial rays used, and

FIGS. 13B, 13C and 13D show diagrammatically the results of correctly determining the axis direction and the size of the hexagons along the axis, incorrectly determining hexagon size, and incorrectly determining axis direction, respectively.

FIGS. 15A and 15B are diagrammatic views of clusters of contiguous rectangles representing image pixels with their colors marked by W (white) and B (black), used in determining whether a pixel is the center of a hexagon.

FIG. 16 is a plan view of the procedure of locating the center of each individual hexagon of the symbol.

DETAILED DESCRIPTION OF THE INVENTION

Figure 2:
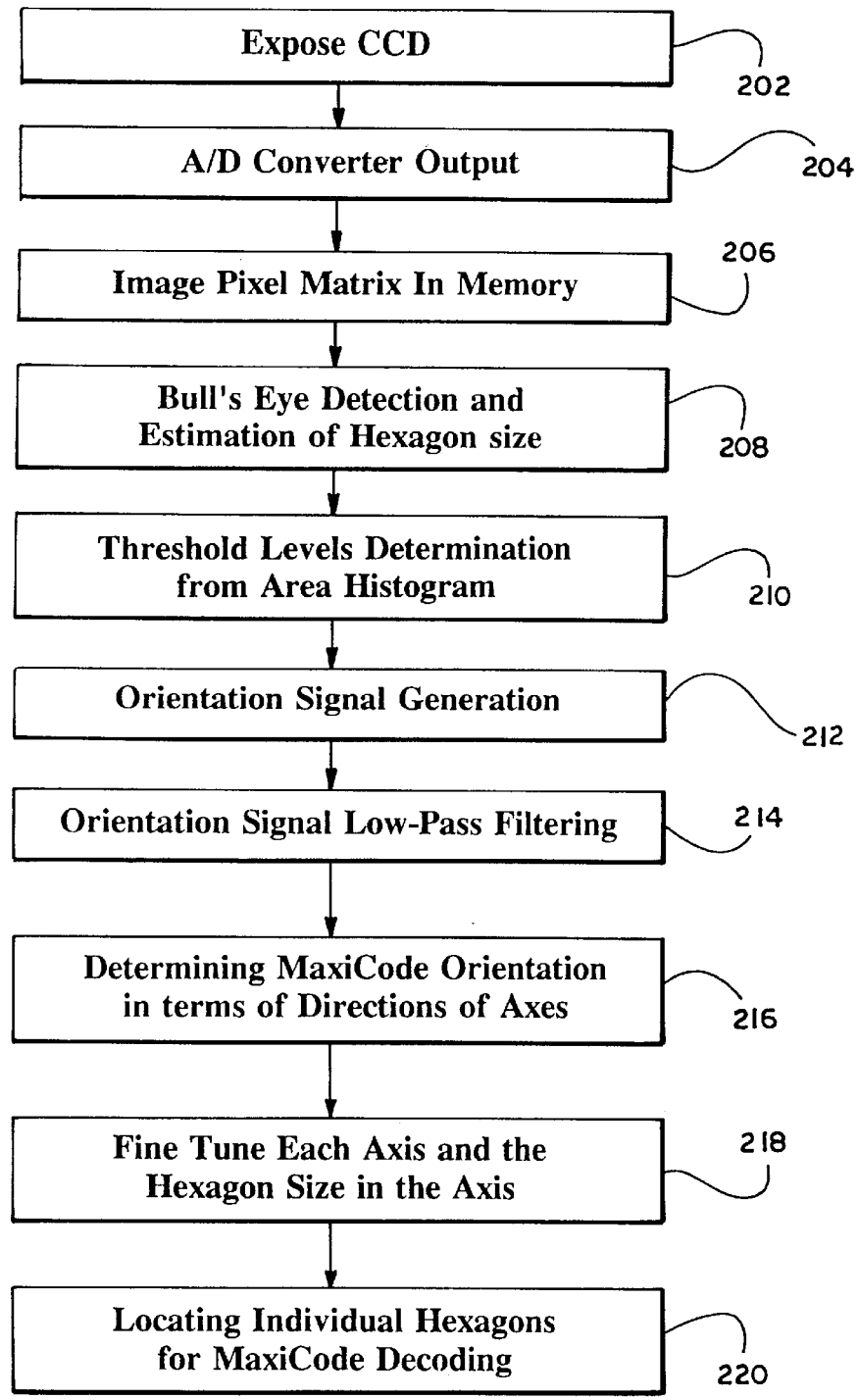
FIG. 2 shows the system flowchart outlining the decoding of the symbol in spatial domain.

Referring now to the drawings, in which like numerals refer to like parts throughout the several views, FIG. 1 shows a prior art two-dimensional symbol 10, known as MaxiCode, which may be positioned on a label, package or the like. The MaxiCode symbology includes a matrix of hexagonal information encoding elements 12 arranged in a square, and, at its center, an acquisition target 100 consisting of six concentric rings of alternating light and dark reflectivity. FIG. 2 is a flow diagram showing the overall process of the present invention for obtaining an image of the symbol, detecting its bull's eye acquisition target, estimating the size of hexagons, determining threshold levels for distinguishing black hexagons from white hexagons, determining the orientation of symbol axes contained within the MaxiCode symbol, fine tuning values for axis direction and hexagon size, and locating the centers of individual hexagons for decoding of the information contained within the symbol. Reference will be made to this overall flow diagram as the subcomponents of the process are described in detail.

Reader Hardware

Referring to FIG. 3, the components of a sensing mechanism 20 are shown diagrammatically. The purpose of the sensing mechanism 20 is to acquire an image of indicia on a surface such as a label 14. This mechanism carries out steps 202, 204, and 206 as indicated in FIG. 2. The sensing mechanism 20 includes a CCD (charge-coupled device) video camera 30, such as a Pulnix 7-CN manufactured by Pulnix America, Inc. of Sunnyvale, Calif. 94086. The target is illuminated by a light source, such as one or more LEDs 22, and the reflected light from the symbol 10 on the label 14 is focused by optics 24 onto the detector of the camera 30. Such a camera includes a matrix of pixels which form an image by providing an output signal related to the amount of light falling on the pixel. These output signals are conventionally read out to an analog-to-digital converter 32 to generate an array of image data which may, for example, range from 0 (black) to 255 (white), and to store such data in a computer memory 34 under control of a microprocessor 36. The process of obtaining such image data in computer memory is described in U.S. Pat. Nos. 4,874,936 and 4,896,029, which are incorporated herein by reference.

The present invention is preferably implemented in software in C language running on a personal computer such as Compaq Deskpro 50M with an image grab card therein. The image grab card provides an interface between the CCD camera and the computer. The image grab card used in the present invention is a PowerGrabber marketed by Dipix Technologies of Canada. The processor 36 in the computer may be programmed by a person of ordinary skill to carry out the following operations on the image data stored in the memory 34. It should also be understood that the functions of the invention could be embodied in hardwired logic circuits or in application specific integrated circuits (ASICs).

To access any pixel in the computer memory 34, two parameters, x representing column and y representing row, that is, coordinates (x, y), are used as an address to a pixel. Therefore, the digitized video signal can be viewed as a two-dimensional image. The x axis as shown in FIG. 1 is parallel to the rows of pixels of the CCD detector of the camera, but the camera may capture the symbol 10 at any angle relative to the x axis. Also, the camera may be tilted relative to the plane of the symbol, causing some distortion of the image.

Acquisition Target Detection

Of the six rings comprising the MaxiCode acquisition target, there are three dark rings 101, 103 and 105 and three light rings 102, 104 and 106, as shown in FIG. 4. The inner light core 102 is considered one of the three light concentric rings. The inner core 102 provides a key element and the other rings provide border elements, all of which can be used to locate the target in a manner described below.

In the stored multiple-row image of the symbol 10, data representing the light rings have high numerical values due to the high reflectivity of the light rings and those data representing the dark rings have low numerical values due to the low reflectivity of the dark rings.

According to the present invention, the location of an acquisition target is not done by matching a synthetic template. Instead, the location process (represented in step 208 of FIG. 2) is carried out within the image data itself by using the symmetric property of the acquisition target. FIG. 4 shows the same acquisition target 100 with four axes separated by 45 degree angles. An axis 300 points to the East or in horizontal direction, an axis 302 points to the North or in vertical direction, and axes 304 and 306 point to the Northeast and Northwest, respectively. Axis 300 is the same as the x axis shown in FIG. 1, and is defined as being parallel to the rows of pixels. In the preferred embodiment shown, the acquisition target is symmetric about any one of these axes. In fact, the symmetry is not limited to these axes in the preferred acquisition target, whose concentric circular rings are omni-directionally symmetric. Of course, references to direction herein, such as "North", or "vertical", are used only to provide a relative frame of reference.

Figure 5A:
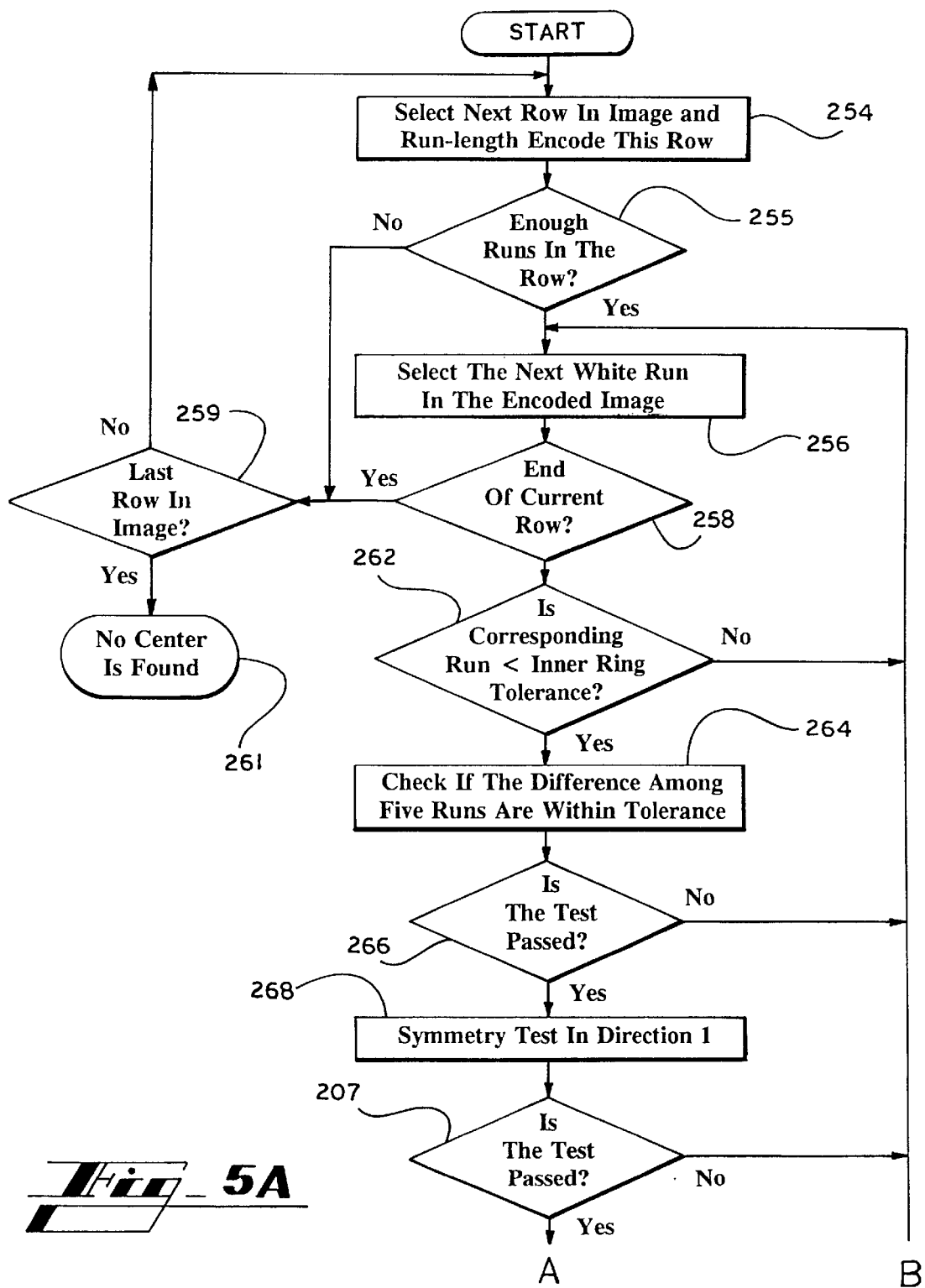
FIGS. 5A and 5B show a system flowchart outlining the steps of the technique of the present invention for locating an acquisition target.
Figure 5B:
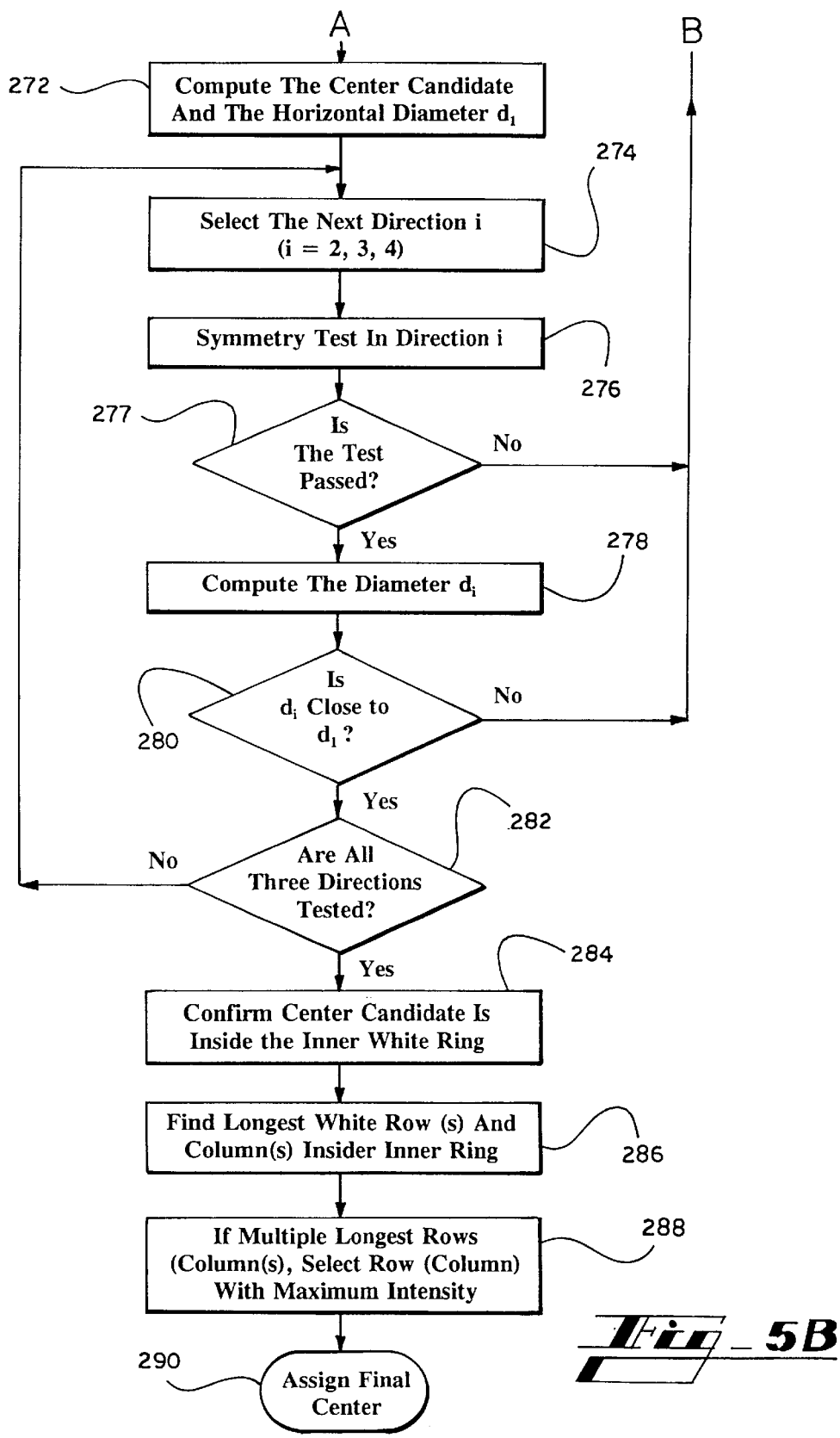

Referring now to FIGS. 5A and 5B, the process of step 208 of FIG. 2 for locating the center of the acquisition target is shown diagrammatically in more detail with reference to corresponding processing devices. Additionally, to provide information for possible estimation of image resolution, the diameter of the target is obtained.

In block 254 a starting row number in the image is selected. Thus, a row of pixel values is being addressed. A threshold for distinguishing white pixels from black pixels is determined from the set of values for the current row. The threshold is used to find transitions between black and white areas of the stored image. There are many methods of determining the threshold known to those in the art, such as the histogram method described in U.S. Pat. No. 4,874,936. Preferably, a middle value computed as $\frac{1}{2}(P_{max}+P_{min})$ is selected as the threshold, where $P_{max}$ and $P_{min}$ are the maximum and minimum pixel values in the current row. Alternately, a threshold may be calculated in the same way for the entire image, but providing a separate threshold for each row is preferred for the process of locating the center of the acquisition target. A different method for determining the threshold is disclosed below in connection with determining the orientation of the symbol.

Based on the calculated threshold, the data can be run-length encoded. The following is an example:

B B B B B B B W W W W W W W B B B W W W W-
WBBBBBWWWWBBBBBWWWW

Those pixel values under the threshold are labeled by letter B (i.e., Black) and those over the threshold are labeled by letter W (i.e., White). The corresponding run-length encoded sequence is given by:

78355454.

The numerical value representing the number of contiguous occurrences of the same letter in the immediate group is called a "run". The total number of runs in the example is 8. Note that the coding is always started with the first black pixel in the scanning direction. Thus, if one indexes the coded sequence by 1, 2, 3, . . . , then the runs indexed by even numbers stand for white runs.

To detect numerically the possibility that a row passing through the center of the acquisition target has currently been encoded, the number of runs is compared with the number of rings at block 255. Along the axis 300 of the target 100, which crosses the five bordering rings 101, 103, 104, 105, 106 twice and the center ring 102 once, there are at least 12 "W to B" or "B to W" transitions. Thus, for a row going through the center white ring 102 of the given target 100, the number of runs must be greater than 13. If the number of runs is less than a predefined number (preferably 13), there is no need to further test for symmetry of the target 100 along this row. In this case the program proceeds to block 259 and tests to determine whether the current row is the last row in the image. If so, a message is generated in block 261 that no target was found in the image. If not, the program returns to block 254 to examine the next row. It will be understood that the predefined minimum number of runs is dependent upon the number of concentric rings comprising the target.

If the number of runs is greater than the predefined number, the program examines in turn each white run in the current row. Due to the pattern of this acquisition target, the first two white runs and the last two white runs cannot be the center white run. Therefore, we can limit the search to the white runs which are respectively offset to the first and last white runs of the coded sequence by a certain number, (e.g., 2). At block 256, the first white run is selected. At block 258, the run is tested to determine if it is already at the end of the current row. If so, the program proceeds to block 259 for the test described above. If not, at blocks 262 and 264 the program tests to determine if the white run represents the inner ring 102. For an image of fixed size, the size of the acquisition target can not be arbitrarily big. A certain maximum length (e.g. 6 pixels) can be imposed on the length of the inner white run in order to speed up the locating process. If the white run is longer than this tolerance, tested at block 262, then there is no need to continue testing this run for symmetry, and the program returns to block 256. If the test result shows the white run is within the tolerance, a further test at block 264 is carried out to compare the white run with the proceeding two white runs and the following two white runs. Note that if the three light rings by design have the same width, as is the case in the preferred target shown in FIG. 4, the width of their corresponding runs may differ from each other by one or at most two pixels as a result of the thresholding process or insufficient image resolution.

There are different ways to compare the similarity between the current white run and the neighboring white runs. One similarity test in the preferred embodiment is to see if the center white run plus one pixel is at least as long as each of its four neighboring white runs. It should be clear that this test is not sensitive to any variation in the black/white pixel threshold described above (that is, the choice of the threshold is not critical). If the center white run plus one pixel is shorter than any one of its four neighboring white runs, then it can not be the representative of the inner ring 102, and the program returns to block 256.

If the current run satisfies the test of block 264, at block 268 the following symmetry test is carried out, given an acquisition target 100 formed of 6 concentric rings originally printed with roughly identical width:

(1) Let l be the length of the current white run. Let $w_1, w_2, w_3, w_4$ be the two preceding and two following white runs, and let $b_1, b_2, b_3, b_4$ be the two preceding and two following black runs, of the current row. Denote the average lengths of white runs and black runs respectively by w and b. Then, $$w = \frac{w_1 + w_2 + w_3 + w_4}{4}; \text{ and}$$

$$b = \frac{b_1 + b_2 + b_3 + b_4}{4}.$$

The symmetry test is satisfied if the two following conditions are met:

|b−w|<2

|$w_j$−w|<2 and |$b_j$−b|<2 for j=1,2,3,4.

where 2 represents the tolerance (2 pixels) allowed for variations in label printer toner and inaccurate image threshold level. Note that the outer dark ring 105 is not used in the test, because its width may sometimes be affected by noisy components (e.g. dark symbol components—hexagons in the case of MaxiCode symbology) adjacent to it. If the foregoing first symmetry test is failed, the program returns to block 256.

After passing the symmetry test along axis 300, at block 272 a candidate center coordinate ($x_1, y_1$) of the acquisition target is declared and the estimated diameter of the entire target along axis 300 (still excluding the outer dark ring 105) is estimated as:

$$d_1 = \sum_{j=1}^{4} w_j + \sum_{j=1}^{4} b_j + l.$$

Based on the candidate center ($x_1, y_1$), further symmetry tests are carried out at blocks 274 to 282 to verify that the coordinates ($x_1, y_1$) are within the center of the acquisition target. A new direction for symmetry testing is selected at block 274. Starting from the pixel ($x_1, y_1$), and using the same threshold as is used in the current horizontal direction, run-length coding both downwardly and upwardly along axis 304 is performed until a total of five "W to B" or "B to W" transitions in each direction are obtained. This results in four white runs and four black runs centered at the candidate center white run. The foregoing symmetry test is applied to these runs at block 276, and the diameter of the acquisition target along this axis is computed and saved at block 278.

It will be understood by those skilled in the art that this diagonal diameter along axis 304, the number of pixels multiplied by a factor of $\sqrt{2}$, should be closely related to the one previously computed along axis 300. The difference between these two diameters is directly proportional to the tilt angle which causes image distortion. A tolerance can be set according to the maximum tilt angle allowed in the imaging process. For example a tolerance of 4 pixels works for tilt angle up to 30 degrees. If the difference is bigger than the selected tolerance, tested at block 280, then the alleged center ($x_1, y_1$) is discarded and the program returns to block 256 to address a new run, and eventually, if necessary, a new row of data for run-length encoding to repeat the above described tests. Otherwise, the program returns to block 274, and the symmetry test and diameter check will be continued along axes 306 and 302, respectively. Finally, if the vertically encoded data along axis 302, passing through the candidate center ($x_1, y_1$), pass the symmetry test and the diameter check, the alleged center ($x_1, y_1$) is confirmed at block 284. In the embodiment shown, any failure will return the program to block 256. However, to allow for distortion or for imperfections in the image of the acquisition target, one failure may be permitted before abandoning the candidate run. For example, failure along one of the diagonal axes may be tolerated if the other diagonal axis and vertical axis pass the symmetry and diameter tests.

It will be understood by those skilled in the art that the candidate center ($x_1, y_1$) must now lie in the inner light ring 102, yet it may not be in the true center of the acquisition target. A fine-tuning procedure at blocks 286 and 288 is executed based on the starting coordinates ($x_1, y_1$). FIG. 6 shows the tuning procedure diagrammatically. The coordinates ($x_1, y_1$) are within the inner ring 102 and assumed to lie at pixel 402. Given $y_1$, a tuning window is defined. The size of the window is defined by the size of the inner white ring 102. The lengths of at least 2 rows of data (the length of the white run) within the inner ring 102 just above and below $y_1$ are counted, such as row $y_0, y_2$ and $y_3$. Numerical values representing the corresponding lengths are then obtained, for example the length of row $y_0$ may be 5 pixels and the length of row $y_2$ may be 7 pixels. The new vertical coordinate is chosen in the longest row, that is, in the row measuring the greatest width of the inner ring 102. This establishes a new candidate center 404 (which in the example shown is at coordinates $(x_1, y_2)$).

Then, the same type of measurement is again performed along the columns based on the coordinates $(x_1, y_2)$, to find the longest column within the inner ring 102 (which turns out to be $x_2$ in the example shown in FIG. 6). The intersection of the longest row and the longest column, at coordinates $(x_2, y_2)$, are the final or true center coordinates of the acquisition target.

When there are two or more column or row length values that happen to be the same, at block 288 of FIG. 5 the pixel intensity values for each of the equal rows or columns are accumulated. The final center coordinate in such a case is selected to be in the row or column having the largest summed intensity value.

There is a fixed size relationship between the overall MaxiCode symbology, the rings of the acquisition target, and the individual hexagons. Therefore, it will be understood that upon determining an estimate of the size of the acquisition target as described above, the average size of the individual hexagons in the image can be calculated. This may be expressed in terms of the average hexagon diameter, which is the distance between opposed flat sides of a hexagon. In the MaxiCode symbology, in which the hexagons are packed together, the hexagon diameter is equal to the distance between the centers of adjacent hexagons. Thus, in the following description, references to hexagon size may be taken to refer also to hexagon spacing. This would not necessarily be true for all two-dimensional symbologies.

Characteristics of the MaxiCode Symbology and of the CCD Image

As noted above, the symbol 10 shown in FIG. 1 includes a matrix of hexagonal information encoding elements 12 arranged in a square, and, at its center, the bull's eye 100 consisting of six concentric rings of alternating light and dark reflectivity. The structure of the packed hexagonal elements or cells dictates a particular relationship of the cells to the center. FIG. 7 shows a MaxiCode symbol diagrammatically. As indicated, there are only six symbol axes 0, 1, 2, 3, 4, 5 passing through the center of the bull's eye and being aligned with a set of hexagons whose centers are collinear. Each symbol axis must be spaced 60 degrees apart. Those skilled in the art will understand that the following techniques can be modified for use with two-dimensional symbologies having more or less than six such axes. For example, a matrix of square elements arranged in rows and columns would have eight axes extending radially from a designated center of the symbology through sets of squares whose centers were collinear. Such axes would be 45 degrees apart. The orientation of the symbology could be determined using only four of these axes, as the difference in element spacing between square elements touching at their sides and others touching at their corners would have to be accounted for to find all eight axes.

Furthermore, spaced around the bull's eye, there are six sets of unique combinations of light and dark hexagons 16, each set comprising three hexagons, as more clearly shown in FIG. 7. These eighteen hexagons together are referred to as sync hexagons. In each set of sync hexagons, two of the three sync hexagons lie adjacent to one another on one of the six symbol axes. Thus, the sync hexagons in the symbol are uniquely positioned so that each of the six symbol axes must pass through two sync hexagons in a row in each set. The pattern of the six sets of sync hexagons does not change with the information encoded in the symbol. As will be appreciated in further description of this invention, this embedded structure is used to uniquely determine the label orientation and adjust the position of each symbol axis.

As noted above, coordinates (x, y) are used as an address to a pixel. The x axis as shown in FIG. 7 is placed horizontally (parallel to the rows of pixels) and the y axis is placed vertically (parallel to the columns of pixels). The origin of the coordinate system is at the center of the bull's eye, which is also the center of the image. Angles in the coordinate system are measured from the x axis in a counterclockwise direction. Thus, in FIG. 7 is defined a major angle 54 which represents the angle between the symbol axis 0 and the horizontal axis x. The major angle defines the true orientation of the symbol in an image. For example, the major angle having a value of 180 degrees means the imaged symbol is positioned unrotated in the image; any other values mean that the imaged symbol has been rotated in the image. Out of the symbol axes 0, 1, 2, 3, 4, 5, there is always and only one symbol axis sustaining an angle from the x axis which must be from 0 to less than 60 degrees. This angle is referred to as the orientation angle 56.

Selecting an Image Area for Determination of Orientation of the Symbol

Based on the center of the bull's eye as determined using the above method, a smaller square image frame 50 of fixed size containing the MaxiCode symbol can be extracted from the original image stored in the computer memory. This is diagrammatically represented in FIG. 7. The center of the MaxiCode symbol is now on the center of the smaller image.

In a typical application, the size of the smaller image 50 may be chosen to be 128 pixels by 128 pixels, for the following reasons. The size of the MaxiCode symbol described above as typically printed is a one inch square. Using a CCD camera as described above, utilized at a convenient distance from a label containing the symbol, the resolution of the image is typically about 90 dots per inch (dpi), that is, the representation of a one inch edge of the symbol in the image is 90 pixels long. Therefore, the MaxiCode symbol usually fits within a 128 pixel by 128 pixel square region of the image, regardless of the orientation of the symbol. It should be noted that the resolution may vary depending on the distance between the label and the camera. In practice, the resolution has been seen to vary from about 70 to about 130 dpi.

Determining Threshold Levels for Use in Finding the Orientation of the Symbol Referring now to step 210 of FIG. 2 and in more detail to FIGS. 8 and 9, a scheme for determining two threshold levels used in the invention is shown. A histogram is first generated from a portion of the image, called a subimage 51, that is centered at the bull's eye 100. A small subimage area is chosen for generating the histogram to avoid the possibility of skewing the histogram by including white areas of the image outside the symbol. FIG. 9 shows that the subimage 51 is chosen as the largest square image inside the symbol 10 of a given size. For example, for the smaller image frame 50 discussed above of size 128 by 128 pixels with the resolution of the MaxiCode symbol being 90 dpi, the size of the subimage 51 is computed as $90/\sqrt{2}$ which is approximately 64 by 64 pixels. A histogram as shown in FIG. 8 is then plotted showing the number of pixels within the subimage 51 which have each of the possible gray scale intensity values (0 through 255).

When the image consists of black and white areas, the histogram normally will have two peaks and one valley in the middle of the peaks. The two gray scale values corresponding to the two peaks' are denoted by LO1 and HI1. The gray scale value corresponding to the valley is denoted by MID. Half way from LO1 and HI1 to MID, there are two gray values respectively denoted by LO2 and HI2. These positions along the intensity scale of the histogram are used in different ways to determine the color of portions of the image.

For example, in determining the color of the sample array of the sync hexagons, if the gray scale value is large than HI2, it is converted to +1 (white). If the gray scale value is less than LO2, it is converted to −1 (black). The rest of the gray scale values are converted to 0 (gray), which may indicate a pixel is at the border between a black hexagon and a white hexagon.

Determining Symbol Orientation

To decode a MaxiCode symbol image, one must know the location of the centers of the hexagons, as well as the corresponding intensity thereof. The orientation of the symbol within the image frame 50 must be determined and used in conjunction with the previously determined center 102 of the symbol to calculate the location of the hexagons. Steps 212 through 218 of FIG. 2 refer to the process of finding the orientation of the symbol.

In summary, the process uses a correlation technique to find the position of the symbol axes. First, a template centered at the center of the bull's eye and having radially extending arms or spindles is rotated over the symbol and gray scale values are compared under the spindles as described below to obtain a sequence of correlation coefficients referred to herein as an "orientation signal." These correlation coefficients are independent of image intensity. This sequence is filtered and analyzed to determine the orientation angle, which is the angle between the x axis of the image and the symbol axis first encountered. The symbol axes lie at the orientation angle and at six radial positions differing from the orientation angle by multiples of 60 degrees. The sync hexagons are used to determine at which of these positions the major symbol axis lies. To account for image distortion and limited image resolution, the direction of each symbol axis and the size of hexagons along each axis are fine tuned.

1. Building a Template.

Referring now to FIG. 10 there is depicted a template 70 comprising six pairs of spindles 74 spaced 60 degrees apart. Each pair of spindles is centered on a radial spindle axis 73 (shown in dotted lines) and has two parallel lines 72 equally spaced one on each side of the spindle axis 73. The lines 72 are positioned a selected distance from the spindle axis, namely a fraction of the estimated average hexagon diameter determined above. This may work out to a distance between the parallel lines 72 of from about 1.0 pixel apart at a resolution of about 70 dpi to about 2.0 pixels apart at a resolution of about 130 dpi. The selected spacing can be determined within this range of values based on the measured resolution of a particular image. Along the parallel lines, special data acquisition locations are plotted and arranged across from one another in pairs. The distance between the parallel lines 72 is chosen so that, when a spindle axis is aligned with a symbol axis, the two data acquisition locations of each pair lie within the same hexagon of the image.

The special data acquisition locations are plotted along the lines 72 as follows. When the template is positioned over the image of the symbol, gray scale pixel values will be recorded for these locations. These locations at one spindle are labeled p1, p2, p3, p4, p5, p6 and q1, q2, q3, q4, q5, q6 respectively. To assure that these points lie outside of the bull's eye region, they begin at a distance of 6 hexagon diameters from the center of the template along the parallel lines 72. The locations p1 . . . p6 are equally spaced from one another by a distance of one hexagon diameter, and the locations q1 . . . q6 are positioned and spaced in the same manner directly across from p1 . . . p6 along the opposite line 72. All together, there are six pairs of lines 72, each providing 2 sets of 6 data acquisition locations. Accordingly, 2 extended sequences of such locations are formed from the p and q locations of all 6 spindles, for a total of 36 p locations and 36 q locations. To concatenate all the values, each sequence has the pixels values labeled as p1, p2, . . . , p36 and q1, q2, . . . , q36 on the template as shown in FIG. 10. As will be explained below, the orientation signal is calculated from a comparison of two sequences of gray scale values corresponding to these two sequences of data acquisition locations.

A new template 70 is generated by the processor 36 for each image acquired by the CCD detector. The bull's eye acquisition procedure described above provides an estimated average hexagon diameter, measured in pixels, that varies with the resolution of the image. Preferably, one of the spindle axes 73 initially lies along the x axis of the image. It would be possible to store many pre-built templates for selection based on the resolution of the image, but this would require significant memory space, and the calculation of a template 70 is accomplished very quickly.

Figure 11:
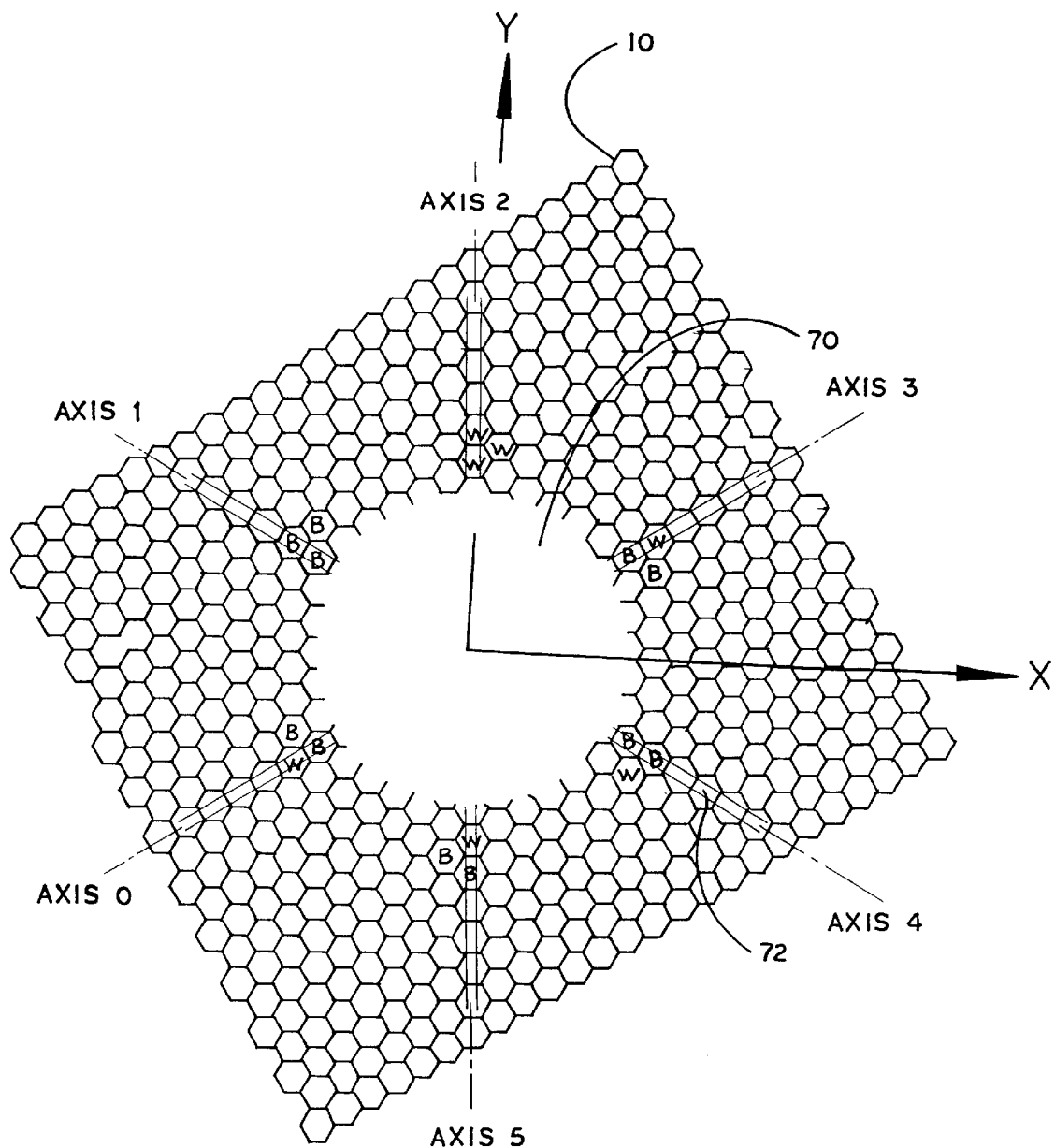
FIG. 11 is a plan view of a MaxiCode symbol of arbitrary orientation with eighteen sync hexagons indicated and six pairs of axes labeled.

Referring now to FIG. 11, there is further shown the process of applying the template 70 to generate the one-dimensional orientation signal from which the label orientation can be estimated. By superimposing the template 70 onto the MaxiCode symbol 10 with the respective centers coinciding, the gray scale values at pixel locations underlying points p1, p2, . . . , p36 can be obtained as a sequence of thirty-six elements. Similarly, the gray scale values at pixel locations underlying points q1, q2, . . . , q36 forms another sequence of thirty-six elements. The correlation coefficient ρ of the two sequences can then be computed. Simply stated, the correlation coefficient of two sequences is a measure of the pair-by-pair difference in gray scale value between the two sequences. The greater the correlation coefficient, the less the difference between the two sequences. The value of the correlation coefficient is always in the range from zero to one inclusively. A correlation coefficient between the two sequences can be calculated by the equation:

$$\rho = \frac{\sum_{i=1}^{36}(g(p_i)-\bar{g}_p)(g(q_i)-\bar{g}_q)}{\left(\sum_{i=1}^{36}(g(p_i)-\bar{g}_p)^2\right)^{1/2}\left(\sum_{i=1}^{36}(g(q_i)-\bar{g}_q)^2\right)^{1/2}}$$

$$\text{where } \bar{g}_p = \frac{1}{36}\sum_{i=1}^{36}g(p_i), \bar{g}_q = \frac{1}{36}\sum_{i=1}^{36}g(q_i).$$

and $g(p_i)$ and $g(q_i)$ stand for the gray scale values of pixels at locations $p_i$ and $q_i$, respectively.

2. Generation of a One-dimensional Orientation Signal

The template 70 is "built over" the image data with the center of the template at the center of the bull's eye, and the coordinates of the data location points noted. The initial orientation of the template is such that the spindle axis 73 associated with one set of parallel lines 72 is aligned with the x-axis of the pixel coordinate system and corresponds to a 0 degree angle. However, it will be understood that the initial placement of the template is not so restricted because the template is symmetric and can be placed randomly so long as the center coincides with the center of the symbol. The two sequences of gray scale values are recorded, and a correlation coefficient $\rho 1$ is calculated for the initial position of the template and stored. Then the template is rotated, preferably counterclockwise, through a fixed angular increment. From the template at the new angle, gray scale values are obtained at the new data location positions, and a new correlation coefficient $\rho 2$ is obtained and associated with the new angle in memory.

The same procedure is repeated at the fixed angular increment until the total rotation of the template reaches 60 degrees. The choice of the angular increment affects the accuracy in locating the orientation of the MaxiCode symbol. Too large an increment may result in an inaccurate orientation angle, while too small an increment introduces more computation burden without significantly improving the accuracy. In the preferred embodiment of the invention, 0.5 degree is used as the increment.

It will be understood by those skilled in the art that, as the template is rotated from zero to sixty degrees in 0.5 degree increments, the inner part of the entire MaxiCode symbol will be "scanned" by the six pairs of the parallel lines 72. Thus, a sequence of 120 correlation coefficients, $\rho 1 \ldots \rho 120$, corresponding to each of the 120 angular increments, is obtained and stored. This sequence or one-dimensional array is referred to as the one-dimensional orientation signal.

The template 70 is designed so that the largest correlation coefficient will be obtained when the spindle axes lie along the centers of the hexagons forming the symbol axes. This is true because at the orientation angle 56, for each data acquisition point in one parallel line 72 of the template, the corresponding point in the other parallel line 72 belongs to the same hexagon and thus the two points should have the same gray scale values. The two sequences so obtained correspond to the largest correlation coefficient among the 120 coefficients. The orientation angle 56 therefore can be estimated by noting the angle which corresponds to a particular characteristic of the orientation signal, preferably the largest correlation coefficient in the stored one-dimensional orientation signal.

At this juncture it is worth while to note again that the spacing between the two parallel lines of the template 70 is important in generating the one-dimensional orientation signal. The spacing should reflect the size of the MaxiCode symbol 10. For MaxiCode symbol labels of fixed image resolution, the spacing is a fixed quantity. It should be small enough so that the six pairs of parallel lines of the template at the orientation angle can fit into the hexagons along the symbol axes 0, 1, 2, 3, 4, 5. This becomes more important when the MaxiCode symbol image contains distortion. The axes of a distorted MaxiCode symbol image are no longer apart from each other by exactly 60 degrees. By reducing the spacing between the two parallel lines of the template 70, there is a good possibility that the parallel lines 72 at the correct orientation still fit into the hexagons along all the six symbol axes. On the other hand, the spacing can not be too small so that the template 70 at some wrong orientation which does not correspond to the orientation angle also yields a large correlation coefficient. Therefore, the spacing is directly proportional to the size of the hexagons. In the preferred embodiment of this invention, the spacing varies from 1.0 to 2.0 pixels, corresponding to the image resolution ranging from 70 dpi to 130 dpi.

3. One-dimensional Orientation Signal Filtering.

Figure 12A:
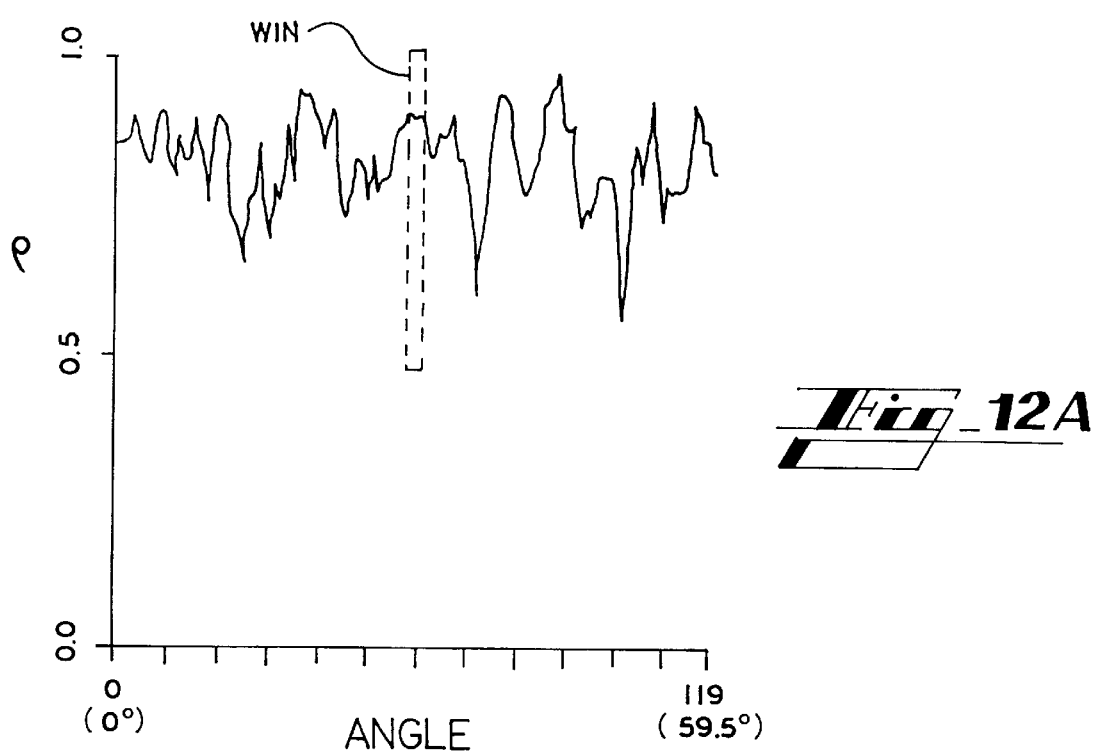
FIG. 12A is a graphical representation of a one-dimensional orientation signal.
Figure 12B:
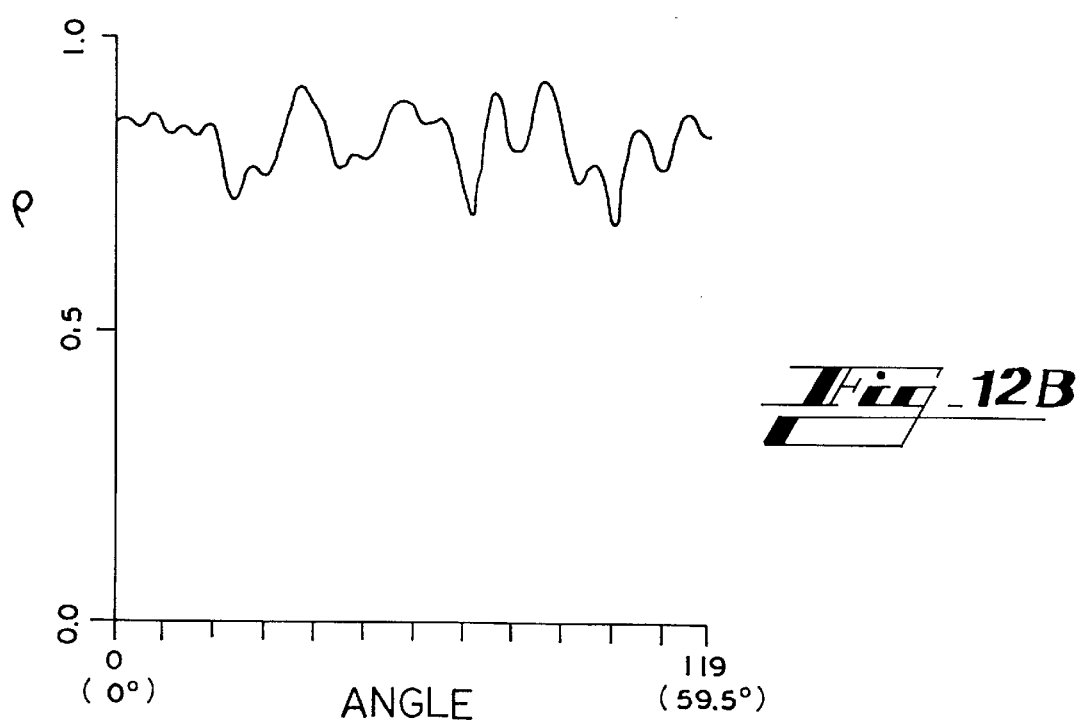
FIG. 12B is a graphical representation of the one-dimensional orientation signal of FIG. 12A after filtering.

The process of selecting the highest correlation coefficient of the one-dimensional orientation signal will now be described. The one-dimensional orientation signal can be plotted as shown diagrammatically in FIG. 12A, which shows the value of the correlation coefficient p plotted against the angular position of the template 70 between 0 and 59.5 degrees. The one-dimensional orientation signal usually contains many steep spikes due to image distortion and noise created from label printing, imaging, and digitization. Therefore, the filtering step 214 of FIG. 2 is necessary to remove these false spikes. The filtering step has the effect of smoothing the curve and reducing the suddenness of any abrupt change. Generally, steep spikes are reduced to lower, broader peaks, while the height of broad peaks remains relatively unchanged. FIG. 12B shows the signal of FIG. 12A after filtering in the following manner.

Since the orientation signal is a function of angles between 0 and 59.5 degrees with an increment of one-half degree, the orientation signal will repeat itself when the angle reaches and goes beyond 60 degrees. The orientation signal can thus be fully represented as a curve changing with the angular increments ranging from 0 to 59.5 degrees, as shown in FIG. 12A. To facilitate the filtering procedure, the curve is wrapped, namely concatenating 0 to 59.5 degrees. Also shown in dotted lines is a moving window WIN, covering a certain number of angles, which is applied to the curve. The coefficients at angles within the window are averaged and the average replaces the value at the center of the window. In this way the spikes in the signal are averaged down. To best preserve the orientation angle and prevent the orientation angle from shifting, the window WIN used in the preferred embodiment contains only three adjacent incremental angular positions of the template. At each angle, the filtered correlation coefficient is computed as the average of the three correlation coefficients corresponding to the angle under consideration and its left and right neighboring angles.

One pass of such low-pass filtering may not necessarily remove all undesirable spikes. In the preferred embodiment, three passes are applied. After three passes of the filtering, there is a great possibility that the orientation angle 56 corresponds to the highest peak in the smoothed orientation signal. In practice, to prevent a case in which the highest peak does not indicate the true orientation angle, a predetermined number of peaks, for example, the five highest peaks, are used to determine the true orientation from the orientation signal. Preferably, the processor finds and selects the tallest remaining peak as one of the candidates. Then, the data for two angular positions on each side of this peak is discarded by setting it to zero. Then the next highest correlation coefficient in the remaining data is found and its angle is selected as a candidate, and the data for two angular positions on each side of this peak is discarded. This is repeated until five candidate angles have been identified.

4. Selecting the Correct Orientation Angle

A selection among the five candidates to be the orientation angle is made by determining which candidate corresponds best to an orientation of the symbol in which the sync hexagons are correctly positioned. One of the symbol axes 0, 1, 2, 3, 4, 5 is apart from the x-axis of the image by the orientation angle. However, to find the symbol orientation, the major angle 54 must be determined. As illustrated in FIG. 7, the major angle and the orientation angle are related by the following equation:

$$\text{major angle} = \text{orientation angle} + (r \times 60°)$$

where the two angles are in units of degree, and r is an integer taking a value of 0, 1, 2, 3, 4, and 5. In the example of a MaxiCode symbol shown in FIG. 7, the value of r is 3.

The orientation angle and the integer r can be determined by using the sync hexagons embedded in MaxiCode symbology. It has been explained that the eighteen sync hexagons form a unique pattern. The pattern may be represented by a one-dimensional array of eighteen elements whose values are either +1 or −1, depending on whether the predetermined color of the hexagons is white or black. Six such one-dimensional arrays may be produced by starting with a different symbol axis each time. As is described above, each symbol axis passes through two sync hexagons. For each axis, the one-dimensional sync array is created by grouping the color of the sync hexagons, represented by either +1 or −1, in a clockwise fashion starting from the axis. Therefore as noted there are six one-dimensional sync arrays, each corresponding to one of the six axes of the MaxiCode symbology. The six one-dimensional arrays can be grouped to create a sync lookup table or two-dimensional array such that each axis can be identified by a properly ordered sync array which is a row of the table. Such a lookup table is shown in Table I, and the values given correspond to the sync hexagons of the symbol shown in FIG. 7.

TABLE I

| 0 | 1 | −1 | −1 | −1 | −1 | −1 | 1 | 1 | 1 | 1 | −1 | −1 | −1 | 1 | −1 | −1 | −1 | 1 |
|---|---|----|----|----|----|----|---|---|---|---|----|----|----|---|----|----|----|---|
| 1 | −1 | −1 | −1 | 1 | 1 | 1 | 1 | −1 | −1 | −1 | 1 | −1 | −1 | −1 | 1 | 1 | −1 | −1 |
| 2 | 1 | 1 | 1 | 1 | −1 | −1 | −1 | 1 | −1 | −1 | −1 | 1 | 1 | −1 | −1 | −1 | −1 | −1 |
| 3 | 1 | −1 | −1 | −1 | 1 | −1 | −1 | −1 | 1 | 1 | −1 | −1 | −1 | −1 | −1 | 1 | 1 | 1 |
| 4 | −1 | 1 | −1 | −1 | −1 | 1 | 1 | −1 | −1 | −1 | −1 | −1 | 1 | 1 | 1 | 1 | −1 | −1 |
| 5 | −1 | −1 | 1 | 1 | −1 | −1 | −1 | −1 | −1 | 1 | 1 | 1 | 1 | −1 | −1 | −1 | 1 | −1 |

Preferably, row 0 of the lookup table contains the one-dimensional sync array which begins with the values of the sync hexagons on the major axis (symbol axis 0), and row 1 begins with the sync hexagon values of symbol axis 1, etc.

For comparison, based on each candidate orientation angle in turn, the gray values at the locations where the centers of the 18 sync hexagons should be are computed to generate a one-dimensional sample array of sync hexagons in gray scale values. A special thresholding scheme (described below) using the histogram of FIG. 8 is applied to convert the sample array into an array of elements being either black, white or gray, with the white hexagons being assigned +1, the black hexagons being assigned −1, and the gray color being assigned 0. The deviation between the array of the sync hexagons and its sample array must be minimized at the correct orientation angle.

More specifically, based on the candidate orientation angle and the average size of the hexagons obtained previously, the proposed center pixel locations of the eighteen sync hexagons can be determined. The gray scale values at these pixel locations are obtained and then converted to either +1, −1 or 0. These numbers are arranged in the one-dimensional sample array according to the same order used in creating the one-dimensional sync arrays of the lookup table. The sample array is then compared with each of the six sync arrays in the sync lookup table to find the sync array which achieves the least sum of sync difference on every element comparison. That is, the corresponding elements of the lookup table array and the sample array are subtracted, and the absolute values of these differences are summed. If, as suggested above, the row numbers of the lookup table correspond to the axis numbers of the symbol, then the row number (axis of the MaxiCode symbol) associated with the most closely matched sync array gives the integer r for determination of the major angle 54. The result of this process is a proposed orientation of the symbol if this candidate angle is the correct orientation angle.

It will be understood by those skilled in the art that by properly ordering the six sync arrays, as described above, the integer number r can be determined as the loop index to the sync array which has the least sum of sync difference from the sample array being tested. This can be achieved in the sync lookup table by marking the sync array associated with axis 0 to be sync array 0, the sync array associated with axis 1 to be sync array 1, and so on. The loop index is from 0 to 5.

To determine which of the candidates out of the five highest peaks of the one-dimensional orientation signal is the correct orientation angle, the above procedure can be done for each candidate angle and the least sum of sync difference recorded. Among all the orientation angle candidates, the candidate which gives the least sum of sync difference is the orientation angle. The axis associated with the sync array which has the least sum of sync difference from the sample array generated by this candidate gives the correct integer r.

The special thresholding scheme used in testing the candidate peaks will now be described. In generating the sample array for each candidate for the orientation angle, two threshold levels, LO2 and HI2, in the histogram of FIG. 8 are employed. A pixel with a gray scale value greater than or equal to HI2 is declared to be white and assigned value 1. A pixel with a gray scale value less than or equal to LO2 is declared to be black and assigned value −1. A pixel with a gray scale value between HI2 and LO2 is declared to be gray and assigned value 0. This scheme essentially ensures that the least sum of sync difference always corresponds to the orientation angle and the correct axis. The major angle can then be computed as the sum of the orientation angle plus r multiples of sixty degrees.

5. Fine Tuning the Directions of the Symbol Axes and the Hexagon Sizes.

From the major angle which corresponds to axis 0, the other five symbol axes can be located by adding different multiples of 60 degrees. Due to the presence of image distortion in some cases (primarily because of labels that are not in a plane perpendicular to the camera optics) and limited image resolution, the initially calculated angular positions of the symbol axes usually deviate from their actual positions by a small offset. Furthermore, all the hexagons in the image may not assume the same size. Therefore, these two parameters, namely, the direction of each axis and the hexagon size along the axis, should be adjusted before they can be used in the determination of the centers of individual hexagons. This occurs at step 218 of FIG. 2.

The two parameters may have no error, that is, the calculated axis passes right though the center of each hexagon on the axis and the size of hexagons along this axis is the same and known. The center coordinates of each hexagon along the axis starting from the center of the bull's eye can then be computed using the angle of axis and the known size of hexagons. However, if either of the two parameters representing the direction of the axis or the size of hexagons along the axis are not accurate, then at least some of the computed centers will not coincide with the actual centers of the hexagons along the axis. To test for accuracy of the two parameters, a procedure shown in the flow diagram of FIG. 14 (and described in detail below) is carried out to determine how many actual hexagon centers are accurately predicted by various combinations of the two parameters, axis direction and hexagon size. The procedure for comparing various combinations of the parameters is diagrammatically illustrated in FIG. 13, and the procedure for determining whether a point in the image is at the center of a hexagon is diagrammatically illustrated in part in FIG. 15. These procedures also are described in detail below. For each pair of parameters, an integer counter is recorded and updated to indicate the number of computed centers which are indeed the actual centers. If the two parameters are of no error, the computed centers of the hexagons along the axis should coincide with the actual centers, and the integer count of accurate centers will be high. If the parameters are not accurate, the integer count of accurate centers associated with the two parameters should be smaller than the one associated with the correct parameters.

Referring now in more detail to FIG. 13A, the six axes computed from the major angle can be adjusted by the following scheme. For example, starting from one of the axes 61, a few rays 61a, 61b, 61c, and 61d originated from the center of the bull's eye in the neighborhood of the axis 61 are selected such that each ray offsets the axis by a multiple of 0.5 degree. These rays as well as the axis 61 become the candidates for the correct axis of the MaxiCode symbol. Similarly, several numbers slightly larger and smaller than the average size of hexagons (estimated as described above) are chosen and used as the candidates for the correct size of hexagons along the correct axis. The step size in searching for the correct size of hexagons is chosen to be 0.05 pixel. So the correct size of the hexagons can only be the average hexagon size plus or minus a multiple of 0.05.

FIG. 13B illustrates a pair of parameters having no error. The proposed ray 61 passes directly through all of the hexagon centers 62 along the axis, and all of the centers are correctly predicted by the proposed hexagon size. FIG. 13C shows a pair of parameters including a correct axis direction but an incorrect hexagon size. Thus, only some correct hexagon centers 62 are predicted, while other predicted centers 63 are not in fact the centers of hexagons on the image. FIG. 13D shows error in both direction and hexagon size. It will be seen that the integer count for the pair of parameters illustrated in FIG. 13B will be greater than the count for FIG. 13C, which will be greater than the count for FIG. 13D.

Each combination of the axis direction candidates and the size candidates is used as a pair of trial parameters to generate an integer counter indicating how many computed coordinates indeed represent the centers of the hexagons. Preferably, hexagons 12a along the candidate axis and hexagons 12n adjacent to both sides of the hexagons along the candidate axis are tested. The pair of trial parameters which generates the largest integer counter is used as the correct axis and the size of hexagons along the axis.

Figure 14:
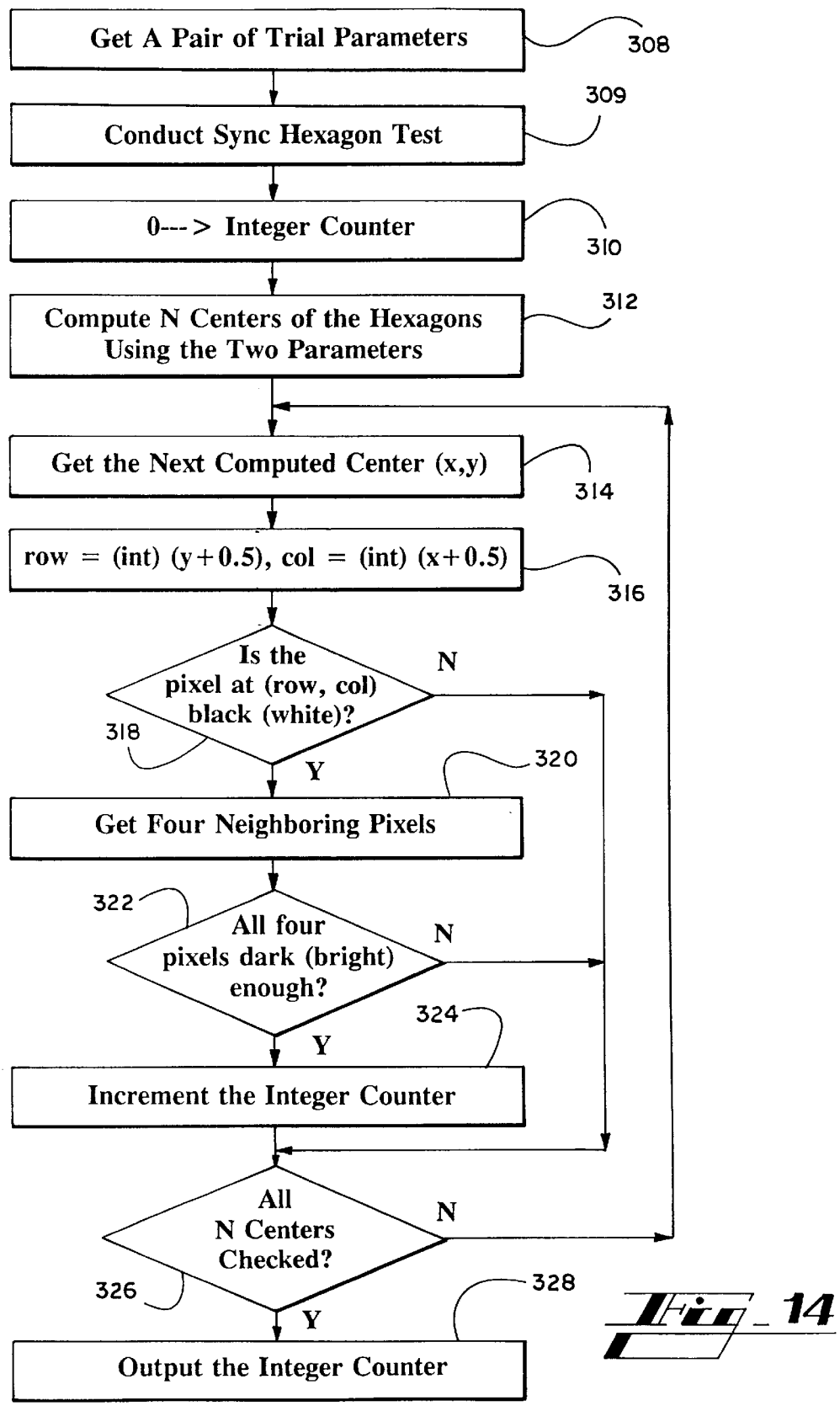
FIG. 14 shows a flowchart outlining the determination of the correct pair of trial parameters in fine-tuning the Maxi-Code symbol axes.

The integer counter associated with each set of trial parameters is generated according to the algorithm depicted in FIG. 14. Initially, at step 308, a pair of trial parameters is selected. At step 309, the sync hexagons can be used to limit the number of iterations of the procedure of FIG. 14 by quickly eliminating some inaccurate pairs of parameters. It has been described that the correct geometrical locations of the 18 sync hexagons can be computed using the correct direction of each axis and correct size of hexagons along the axis. If the wrong size of hexagons and wrong direction of an axis are utilized in computing these locations, the pixel values for hexagons at these computed locations can not result in a satisfactory match to the known colors of the sync pattern. Only those pairs of parameters which generate a good match to the sync hexagons need be used in the subsequent procedure of FIG. 14.

For each pair of trial parameters, the color of pixels at the computed locations of the three sync hexagons must match the color of the true sync hexagons around the axis in question. The colors of pixels may be determined by using only the threshold level MID of the histogram of FIG. 8 to distinguish black from white. The threshold level MID is the valley point in the histogram. There are many alternate ways known to those skilled in the art to determine the value. Using MID, either black or white can be determined depending on whether the gray scale values of the pixels are either less than or no less than MID. If a pair of trial parameters fails to generate the correct sync pattern, then there is no need to proceed to compute the integer counter associated with the pair of trial parameters, which can be discarded.

For a pair of trial parameters selected at step 308 representing the direction of a ray and the hexagon size along the ray, having passed the foregoing sync pattern test of step 309, the associated integer counter is initialized to be zero at step 310. A predetermined number of hexagon centers along the ray, represented by image coordinates (x, y), as well as centers of hexagons adjacent to those along the ray, are computed at step 312. The numbers x and y are intended to be in floating point representation for accuracy. For each of the six MaxiCode symbol axes, the predetermined number along the ray can be chosen as the number of hexagons along the axis. For example, the numbers 9, 11, 11, 10, 11, 11 can be used for axes 0, 1, 2, 3, 4, 5 respectively.

At step 314, one of the computed hexagon centers (x, y) is selected. The coordinates (x, y) are converted to integer values at step 316 using row=(int) (y+0.5), col=(int) (x+0.5), where int means only the integer part of the number is taken. This is to assure that the floating point coordinates are converted to the integer coordinates of the pixel whose center is closest to the floating point values. The pixel at the location (row, col) is then checked to see whether it is black, white or neither. The gray scale threshold test used here is based on levels LO1 and HI1 of the histogram of FIG. 8. If the value of the pixel is neither larger than HI1 nor smaller than LO1, then the pixel cannot be the center of a hexagon and no further checking is required for the pixel. If the gray scale value is smaller than LO1, then the pixel is declared black and denoted by B. If the gray scale value is larger than HI1, then the pixel is declared white and denoted by W. In both cases, the locations of four neighboring pixels of the pixel under examination are obtained at step 320, using a method described below. Further checking of the four neighboring pixels proceeds at step 322. None of the gray scale values of the four neighboring pixels of a black pixel B should be greater than histogram level LO2, whereas none of the gray scale values of the four neighboring pixels of a white pixel W should be less than HI2. Only after passing these tests is the pixel confirmed to be the center of a hexagon, and the integer counter associated with the pair of parameters being tested is incremented at step 324.

The process returns to step 314 and is repeated to check whether the coordinates of the next computed hexagon center in fact lie at the center of a hexagon in the image. After testing the predetermined number of computed centers, the integer counter associated with the pair of trial parameters is finally determined at step 328, and the process returns to step 308 for selection of another pair of parameters. After all of the predetermined number of pairs trial parameters have been tested in this manner, the axis is assigned a direction and hexagon size equal to those of the pair of trial parameters having the highest integer count representing the highest number of computed coordinates which indeed represent the centers of hexagons.

In block 320, different schemes are used in obtaining the four pixels neighboring the pixel at a computed center. Referring to FIG. 15A, for a black pixel B, its four neighboring pixels directly above, below and to its sides, denoted by B1, B2, B3 and B4, are used. For a white pixel W, a block of four pixels including W are used, as shown in FIG. 15B. That is, the four nearest neighboring pixels of coordinates (x, y), denoted by W1, W2, W3, and W4, are used, and depending on the value after the decimal point in x and y, W can be any one of W1, W2, W3, and W4.

Using different schemes in verifying the center of a black versus a white hexagon is based on the consideration that a white hexagon surrounded by black hexagons may have smaller size in terms of number of pixels. This is especially true when lighting is relatively dim for the CCD sensory array. Optionally, the scheme in obtaining the four neighboring pixels of a black pixel can be replaced by the one used for a white pixel.

It should be noted that the foregoing method for verifying the center of a hexagon may be used for images with various dynamic range.

The following considerations are important in correctly determining the correct axes and their corresponding sizes of hexagons. For a ray in the neighborhood of a correct axis, the coordinates (x, y) in the ray are computed from the pair of the trial parameters. Furthermore, the coordinates representing the centers of the neighboring hexagons 12n relative to those computed centers along the ray can similarly be computed from the same pair of trial parameters. All these coordinates can be used in generating the integer counter. In the implementation of the present invention, the hexagon 12a center coordinates along each ray as well as those of the two neighboring radial "rows" of hexagons 12n as shown in FIG. 13A are computed. The ray and the two "rows" of hexagons are parallel to each other. This scheme improves the searching accuracy when there are blocks of black and/or white hexagons along some of the six axes.

While each of the six symbol axes can be adjusted independently of each other in the same way as described above, once one axis has been adjusted, a preferred search method bases the search for a new axis on the search results obtained from the axis (or axes) already adjusted. Thus, in the preferred embodiment of the invention, to search for the pair of trial parameters which best describe the direction of the each true axis and the size of the hexagons along the axis, despite a degree of distortion, a special order should be observed. The search is performed first to determine the true axis 0 and the size of the hexagons along axis 0. The search space consists of five sizes of hexagons with the average hexagon size in the middle and five rays with the computed axis 0 in the middle, according to the model shown in FIG. 13A. The axis in the middle, which is the computed axis 0 in this case, is called the starting axis. A vector in the direction of axis 0 whose direction is corrected by the search process and whose magnitude is equal to the size of the hexagons can be computed. In FIG. 16, the vector is represented by $v_0$. Similarly, a vector in the direction of axis 3, denoted by $v_3$, can be obtained.

To best generate a search space for each of the true symbol axes 1, 2, 4, and 5, the search results obtained from axes 0 and 3 should be utilized in the following way. If the length of $v_0$ is the same as the average hexagon size, then the computed symbol axis 1 is used as the starting axis to start the search. If the length of v0 (representing hexagon size) differs from the average hexagon size by a positive (or negative) multiple of the trial parameter step size 0.05, then instead of using the computed axis 1 as the starting axis, the search for symbol axis 1 should begin with the computed axis 1 plus (or minus) the same multiple of the angle step interval (0.5 degree). A total of five rays is still used in the search as described above. The search is then carried out resulting in a vector $v_1$ in the direction of the true symbol axis 1. Similarly, the search for symbol axis 5 should begin with the computed axis 5 minus (or plus) the same multiple of 0.5 degree. A vector $v_5$ can be obtained from the search process.

According to the length of $v_3$, the computed axes 2 and 4 can be adjusted in the same way in order to locate the starting axis for the search process. The search results in two vectors $v_2$ and $v_4$ in the directions of axes 2 and 4 respectively.

Locating Centers of All Hexagons of the Symbol

Referring now to FIG. 16, there is illustrated a systematic way of locating the centers of hexagons of the MaxiCode symbol image. Using the vectors $v_0, v_1, \ldots, v_5$, which embody an adjusted hexagon size individually determined for each symbol axis, the centers of the hexagons along the six symbol axes can be determined. The centers of the hexagons within the area bounded by axis 0 and axis 1 may then be located by using vector $v_0$. That is, the center of each hexagon in each partial row of hexagons extending to the left of axis 1 may be found by adding multiples of vector v0 to the coordinates of a hexagon along axis 1. For example, the center of the hexagon 69 in FIG. 16 is determined by adding a multiple of v0 ($6 \times v_0$) to the position of hexagon 68 which lies on the axis 1. Starting at the center 102 of the symbol image, the position of hexagon 69 can be represented by the vector equation: $14v_1 - 6v_0$. The same process is used to determine those centers within the area bounded by axis 0 and axis 5, by adding multiples of vector v0 to the coordinates of hexagons along axis 5.

Similarly, the centers of the hexagons in the area bounded by axes 2 and 4 can be located by adding multiples of vector $v_3$ to the coordinates of hexagons along the symbol axes 2 and 4. For the hexagons within the area between axes 1 and 2, multiples of vector $(v_2 - v_1)$ are added to the coordinates of hexagons along axis 1. For the hexagons within the area between axes 4 and 5, multiples of the vector $(v_4 - v_5)$ are added to the coordinates of hexagons along axis 5.

Treating the six segments of the symbol individually in the above manner minimizes error accumulation when distortion is present.

The gray scale values at the centers of the hexagons form a matrix of numbers and can be used in the subsequent decoding process. A decoding process is described in U.S. Pat. Nos. 4,874,936 and 4,896,029.

The present invention has been described in relation to particular embodiments which are intended in all respects to be illustrative rather than restrictive. Alternative embodiments will become apparent to those skilled in the art to which the present invention pertains without departing from its spirit and scope. Accordingly, the scope of the present invention is defined by the appended claims rather than the foregoing description.

What is claimed is:

1. A method of finding collinear elements in a graphic image comprising an array of said elements, regardless of the pattern of gray scale intensities of said collinear elements, comprising the steps of:

developing a sampling template for plotting data acquisition locations in said image, said template having two sequences of data acquisition points, each sequence spaced along one of two parallel lines spaced apart by a distance shorter than a width of each of said elements measured perpendicular to the parallel lines, the sequences together defining pairs of points having a first point positioned on one of the parallel lines across from a second point of said pair on the other parallel line;

positioning said template on said image data;

acquiring gray scale intensities at said data acquisition locations indicated by said template;

comparing gray scale intensities corresponding to the first points of said pairs to gray scale intensities corresponding to respective second points of said pairs to determine a correlation factor between said sequences of said first points and said second points, representing a measure of the pair-by-pair difference in gray scale value between the two sequences of points;

moving said sampling template into varying orientations with respect to said image and determining said correlation factor for each position of said template; and identifying one or more sets of collinear elements in said image by finding one or more template positions associated with characteristic values of said correlation factor.

2. The method of claim 1 wherein said series of pairs of points extend radially from a template center point; wherein said step of positioning said template comprises positioning said template center point at a center point of said image; and wherein said step of moving said template comprises rotating said template about said template center point.

3. An image processor for locating in an image one or more sets of contiguous elements whose centers are collinear, comprising:

a sampling template for plotting data acquisition locations in said image, said template having two sequences of data acquisition points, each sequence spaced along one of two parallel lines spaced apart by a distance shorter than a width of each of said elements measured perpendicular to the parallel lines, the sequences together defining pairs of points having a first point positioned on one of the parallel lines across from a second point of said pair on the other parallel line;

a positioner for positioning said template on said image and for moving said sampling template into varying orientations with respect to said image;

a comparator for comparing gray scale intensities of the first points of said pairs to gray scale intensities of respective second points of said pairs to determine a correlation factor between said sequences of said first points and said second points, representing a measure of the pair-by-pair difference in gray scale value between the two sequences of points; and a finder for identifying said one or more set of collinear elements by finding one or more template positions associated with characteristic values of said correlation factor.

4. The image processor of claim 3, wherein said series of pairs of points extend radially from a template center point; and wherein said positioner positions said template center point at a center point of said image and moves said template by rotating said template about said template center point.

5. A method of determining the orientation of a two-dimensional, optically readable symbol of the type having elements of at least two different reflectivities, and at least one radial set of contiguous elements whose centers lie along a line passing through an origin point of said symbol, comprising the steps of:

deriving a multiple-row image including said symbol from a pixel matrix and storing said image;

developing a sampling template for plotting data acquisition locations in said image, said template having two sequences of data acquisition points, each sequence spaced along one of two parallel lines spaced apart by a distance shorter than a width of each of said elements, the sequences together defining pairs of points having a first point positioned on one of the parallel lines across from a second point of said pair on the other parallel line;

comparing gray scale intensities at the first points of said pairs to gray scale intensities at the second points of said pairs to determine a correlation factor between said sequences of said first points and said second points, representing a measure of the pair-by-pair difference in gray scale value between the two sequences of points;

rotating said sampling template in increments about said origin and repeatedly determining said correlation factor for each rotational position of said template; and identifying said radial set of contiguous elements by finding the rotational position associated with characteristic values of said correlation factor.

6. The method of claim 5, wherein said step of identifying said radial set of contiguous elements further comprises forming a one-dimensional signal by plotting correlation factor against rotational position, and filtering said signal.

7. The method of claim 5, further comprising locating said origin point of said symbol by the steps of:

locating a bounded element demonstrating symmetry along at least two directions; and determining a center of said bounded element.

8. The method of claim 5, wherein said symbol comprises a plurality of polygonal information encoding elements arranged in a matrix.

9. The method of claim 5, wherein said step of finding the position associated with characteristic correlation factor values comprises forming an orientation signal comprising a sequence of said correlation factors for each position of said template, and comparing the height of peaks of said signal to find the highest peak.

10. The method of claim 9, further comprising the step of low-pass filtering said peaks of said orientation signal.

11. A method of determining the orientation of a two dimensional, optically readable symbol of the type having a plurality of radial sets of contiguous elements whose centers lie along axes passing through an origin point of said symbol and spaced evenly around said origin, said elements being one of at least two different reflectivities, comprising the steps of:

deriving a multiple-row image including said symbol from a pixel matrix and storing said image;

developing a sampling template for plotting data acquisition locations in said image, said template having a plurality of sets of data acquisition locations, each of said sets including two sequences of data acquisition points, each sequence spaced along one of two parallel lines spaced apart by a distance shorter than a width of each of said elements, the sequences together defining pairs of points having a first point positioned on one of the parallel lines across from a second point of said pair on the other parallel line, the number and spacing of said sets being equal to the number and spacing of said symbol axes;

comparing gray scale intensities at the first points of said pairs to gray scale intensities at the second points of said pairs for all of said sets, to determine a correlation factor between said sequences of said first points and said second points, representing a measure of the pair-by-pair difference in gray scale value between the sequences of points, for all of said sets;

rotating said sampling template in increments about said origin and repeatedly determining said correlation factor for each rotational position of said template; and identifying the position of said axes of said radial sets of contiguous elements by finding the rotational position of said template associated with the highest correlation factor.

12. The method of claim 11, wherein said symbol comprises a plurality of polygonal information encoding elements arranged in a matrix.

13. The method of claim 11, wherein each axis of said symbol has associated therewith a unique pattern of orientation elements, and further comprising identifying each of said axes by determining which pattern of orientation elements is associated with said axis.

14. The method of claim 13, further comprising a method of individually adjusting the positions of said axes comprising the steps of:

selecting a plurality of combinations of axis directions and element sizes as trial parameters;

for each pair of trial parameters in turn, determining the locations in said image at which the centers of elements would occur along said axis;

determining whether centers of elements actually occur at said locations; and selecting the pair of trial parameters which best locate actual hexagon centers.

15. The method of claim 14, wherein said step of determining the locations in said image at which the centers of elements would occur along said axis includes determining the locations at which the centers of elements would occur adjacent to said axis.

16. The method of claim 14, wherein the method of individually adjusting the positions of said axes further comprises determining whether each pair of trial parameters predicts the colors of said unique pattern of orientation elements.

17. The method of claim 16, further comprising the step of calculating the positions of the centers of elements in an area adjacent to each of said axes using the element size individually adjusted for each of said axes.

18. The method of claim 17, wherein said symbol comprises a plurality of polygonal information encoding elements arranged in a matrix.

19. The method of claim 14, wherein said step of determining whether centers of elements actually occur at said locations comprises determining for each of said locations whether neighboring pixels of said image are the same color as the color at said location.

20. A method of reading an optically encoded, two dimensional symbol of the type having elements of at least two different reflectivities, a key element, said key element being a geometrically symmetric, bounded element of a first reflectivity completely surrounded by an area of a second reflectivity, and a plurality of radial sets of contiguous elements whose centers lie along axes passing through an origin point at the center of said key element, said axes being spaced evenly around said origin and each axis of said symbol having associated therewith a unique pattern of orientation elements, comprising the steps of:

deriving a multiple-row image including said symbol from a pixel matrix and storing said image;

locating said key element by:
scanning said stored image along a scanning direction to detect a candidate bounded element demonstrating symmetry along said scanning direction; and
determining whether said candidate bounded element is symmetric along a second direction;

locating said origin point by examining gray scale intensifies within said key element to locate a center of said key element;

determining the approximate size of the elements of said symbol by averaging a plurality of different diameters of said key element;

locating the position of said axes of said radial sets of contiguous elements by
developing a sampling template for plotting data acquisition locations in said image, said template having a plurality of sets of data acquisition locations, each of said sets including two sequences of data acquisition points, each sequence spaced along one of two parallel lines spaced apart by a distance shorter than a width of each of said elements, the sequences together defining pairs of points having a first point positioned on one of the parallel lines across from a second point of said pair on the other parallel line, the number and spacing of said sets being equal to the number and spacing of said symbol axes;
comparing gray scale intensities at the first points of said pairs to gray scale intensities at the second points of said pairs for all of said sets, to determine a correlation factor between said sequences of said first points and said second points, representing a measure of the pair-by-pair difference in gray scale value between the sequences of points, for all of said sets;
rotating said sampling template in increments about said origin and repeatedly determining said correlation factor for each position of said template; and
finding the position of said template associated with the highest correlation factor;
identifying each of said axes by determining which pattern of orientation elements is associated with said axis;
determining the center coordinates of each element of said symbol using the coordinates of said origin point, the orientation of said axes, and the estimated size of said elements; and
determining the reflectivity of each of said elements by analyzing gray scale intensity near its center.

21. A system for determining the orientation of an optically readable, two dimensional symbol of the type having elements of at least two different reflectivities, and a plurality of radial sets of contiguous elements whose centers lie along axes passing through an origin point of said symbol and spaced evenly around said origin, comprising:
- a light source;
- a detector comprising an array of pixels positioned to receive light from said light source reflected by said symbol;
- a read-out circuit connected to obtain data signals from said pixels and to form in a memory device an image including said symbol; and
- a processor configured to locate the position of said axes of said radial sets of contiguous elements by:
  - developing a sampling template for plotting data acquisition locations in said image, said template having a plurality of sets of data acquisition locations, each of said sets including two sequences of data acquisition points, each sequence spaced along one of two parallel lines spaced apart by a distance shorter than a width of each of said elements, the sequences together defining pairs of points having a first point positioned on one of the parallel lines across from a second point of said pair on the other parallel line, the number and spacing of said sets being equal to the number and spacing of said symbol axes;
  - comparing gray scale intensities at the first points of said pairs to gray scale intensities at the second points of said pairs for all of said sets, to determine a correlation factor between said sequences of said first points and said second points, representing a measure of the pair-by-pair difference in gray scale value between the sequences of points, for all of said sets;
  - rotating said sampling template in increments about said origin and repeatedly determining said correlation factor for each position of said template; and
  - finding the position of said template associated with the highest correlation factor.

22. The system of claim 21, wherein said symbol comprises a plurality of polygonal information encoding elements arranged in a matrix.

23. A system for reading an optically encoded, two dimensional symbol of the type having elements of at least two different reflectivities, a key element, said key element being a geometrically symmetric, bounded element of a first reflectivity completely surrounded by an area of a second reflectivity, and a plurality of radial sets of contiguous elements whose centers lie along axes passing through an origin point at the center of said key element, said axes being spaced evenly around said origin and each axis of said symbol having associated therewith a unique pattern of orientation elements, comprising:
- a light source;
- a detector comprising an array of pixels positioned to receive light from said light source reflected by said symbol;
- a read-out circuit connected to obtain data signals from said pixels and to form in a memory device an image including said symbol; and
- a processor configured to locate said key element, locate the position of said axes of said radial sets of contiguous elements, and locate each of said elements by:
  - deriving a multiple-row image including said symbol from a pixel matrix and storing said image;
  - locating said key element by:
    - scanning said stored image along a scanning direction to detect a candidate bounded element demonstrating symmetry along said scanning direction; and
    - determining whether said candidate bounded element is symmetric along a second direction;
  - locating said origin point by examining gray scale intensities within said key element to locate a center of said key element;
  - determining the approximate size of the elements of said symbol by averaging a plurality of different diameters of said key element;
  - locating the position of said axes of said radial sets of contiguous elements by
    - developing a sampling template for plotting data acquisition locations in said image, said template having a plurality of sets of data acquisition locations, each of said sets including two sequences of data acquisition points, each sequence spaced along one of two parallel lines spaced apart by a distance shorter than a width of each of said elements, the sequences together defining pairs of points having a first point positioned on one of the parallel lines across from a second point of said pair on the other parallel line, the number and spacing of said sets being equal to the number and spacing of said symbol axes;
    - comparing gray scale intensities at the first points of said pairs to gray scale intensities at the second points of said pairs for all of said sets, to determine a correlation factor between said sequences of said first points and said second points, representing a measure of the pair-by-pair difference in gray scale value between the sequences of points, for all of said sets;
    - rotating said sampling template in increments about said origin and repeatedly determining said correlation factor for each position of said template; and
    - finding the position of said template associated with the highest correlation factor;
  - identifying each of said axes by determining which pattern of orientation elements is associated with said axis;
  - determining the center coordinates of each element of said symbol using the coordinates of said origin point, the orientation of said axes, and the estimated size of said elements; and
  - determining the reflectivity of each of said elements by analyzing gray scale intensity near its center.

24. The system of claim 23, wherein said symbol comprises a plurality of polygonal information encoding elements arranged in a matrix.

25. A method of finding collinear elements in a graphic image comprising an array of said elements, regardless of the pattern of gray scale intensities of said collinear elements, comprising the steps of:
- acquiring gray scale intensities of said image at two sequences of data acquisition points, each sequence spaced along one of two parallel lines spaced apart by a distance shorter than a width of each of said elements measured perpendicular to the parallel lines, the sequences together defining pairs of points having a first point positioned on one of the parallel lines across from a second point of said pair on the other parallel line;
- comparing gray scale intensities corresponding to the first points of said pairs to gray scale intensities corresponding to respective second points of said pairs to determine a correlation factor between said sequences of said first points and said second points, representing a measure of the pair-by-pair difference in gray scale value between the two sequences of points;

moving said parallel lines defining data acquisition points into varying orientations with respect to said image and determining said correlation factor for each orientation of said parallel lines; and identifying one or more sets of collinear elements in said image by finding one or more of said positions of said parallel lines associated with characteristic values of said correlation factor.

* * * * *